(12) United States Patent
Komura et al.

(10) Patent No.: US 8,437,237 B2
(45) Date of Patent: May 7, 2013

(54) LIGHT SOURCE UNIT INCLUDING A PHOTODETECTOR, AND THERMALLY-ASSISTED MAGNETIC RECORDING HEAD

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 104 days.

(21) Appl. No.: 12/986,532

(22) Filed: Jan. 7, 2011

(65) Prior Publication Data

US 2012/0176874 A1 Jul. 12, 2012

(51) Int. Cl.
*G11B 7/00* (2006.01)

(52) U.S. Cl.
USPC .................................. 369/112.03; 369/112.27

(58) Field of Classification Search .......................... None
See application file for complete search history.

(56) References Cited

U.S. PATENT DOCUMENTS

| | | | |
|---|---|---|---|
| 5,144,603 A * | 9/1992 | Mozume et al. | 369/44.14 |
| 5,481,082 A | 1/1996 | Yamamoto | |
| 6,687,196 B1 | 2/2004 | Ueyanagi | |
| 7,171,080 B2 * | 1/2007 | Rausch | 385/37 |
| 7,372,648 B2 | 5/2008 | Akiyama et al. | |
| 7,538,978 B2 | 5/2009 | Sato et al. | |
| 7,821,880 B2 | 10/2010 | Tanaka et al. | |
| 7,852,587 B2 | 12/2010 | Albrecht et al. | |
| 2003/0174630 A1* | 9/2003 | Izawa | 369/99 |
| 2005/0213436 A1 | 9/2005 | Ono et al. | |
| 2006/0233061 A1* | 10/2006 | Rausch et al. | 369/13.32 |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |
| 2010/0007980 A1 | 1/2010 | Kim et al. | |
| 2010/0118666 A1 | 5/2010 | Mihara | |
| 2010/0238580 A1 | 9/2010 | Shimazawa et al. | |
| 2010/0255461 A1* | 10/2010 | Callenbach et al. | 435/5 |
| 2011/0026377 A1* | 2/2011 | Shimazawa et al. | 369/13.24 |
| 2011/0122737 A1* | 5/2011 | Shimazawa et al. | 369/13.24 |
| 2011/0128827 A1 | 6/2011 | Shimazawa et al. | |
| 2011/0157738 A1 | 6/2011 | Shimazawa et al. | |
| 2012/0044790 A1* | 2/2012 | Shimazawa et al. | 369/13.32 |

FOREIGN PATENT DOCUMENTS

| JP | A-2009-301597 | 12/2009 |
|---|---|---|
| JP | A-2010-225798 | 10/2010 |

OTHER PUBLICATIONS

Aug. 2, 2011 Office Action issued in U.S. Appl. No. 12/832,593.
Rottmayer, R. et al., "Heat-Assisted Magnetic Recording," *IEEE Transactions on Magnetics*, Oct. 2006, pp. 2417-2421, vol 42, No. 10.

(Continued)

*Primary Examiner* — Paul Huber
(74) *Attorney, Agent, or Firm* — Oliff & Berridge, PLC

(57) ABSTRACT

A light source unit includes a light source and a photodetector. The light source has an emission part for emitting light. The photodetector has a light receiving surface for receiving the light emitted from the emission part, and detects the light. The light source unit further includes a grating made of metal and disposed to extend along the light receiving surface. The grating includes a plurality of line-shaped portions that each extend in a direction intersecting the direction of travel of the light and that are located at positions different from each other along the direction of travel of the light.

21 Claims, 12 Drawing Sheets

OTHER PUBLICATIONS

U.S. Appl. No. 12/832,593, filed Jul. 8, 2010 in the name of Koji Shimazawa et al.

U.S. Appl. No. 12/728,510, filed Mar. 22, 2010 in the name of Koji Shimazawa et al.

* cited by examiner

LIGHT SOURCE UNIT INCLUDING A PHOTODETECTOR, AND THERMALLY-ASSISTED MAGNETIC RECORDING HEAD

BACKGROUND OF THE INVENTION

1. Field of the Invention

The present invention relates to a light source unit including a light source and a photodetector, and to a thermally-assisted magnetic recording head provided with the light source and the photodetector.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technique so-called thermally-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with laser light.

The laser light to be used for generating the near-field light is typically guided through a waveguide provided in the slider to the plasmon generator disposed near the medium facing surface of the slider. Possible techniques of placement of a light source for emitting the laser light are broadly classified into the following two. A first technique is to place the light source away from the slider. A second technique is to secure the light source to the slider.

The first technique requires an optical path of extended length including such optical elements as a mirror, lens, and optical fiber in order to guide the light from the light source to the waveguide. This causes the problem of increasing energy loss of the light in the path. The second technique is free from the aforementioned problem since the optical path for guiding the light from the light source to the waveguide is short.

U.S. Patent Application Publication No. 2008/0043360 A1 discloses a thermally-assisted magnetic recording head that uses the aforementioned second technique. The thermally-assisted magnetic recording head includes a slider and a light source unit. The slider has a waveguide with its incidence end face located in a surface of the slider opposite to the medium facing surface. The light source unit includes a light source support substrate, and a laser diode as a light source disposed on the light source support substrate. The light source unit is secured to the surface of the slider opposite to the medium facing surface so that laser light emitted from the laser diode is incident upon the incidence end face of the waveguide.

The laser diode, which is a semiconductor element, has such a property that even at the same power applied thereto, the intensity of emitted light significantly varies with varying ambient temperatures or variations in the temperature of the laser diode caused by its own heat generation. The variation in the intensity of emitted light from the laser diode leads to unfavorable variations in the intensity of the near-field light for the thermally-assisted magnetic recording head. For this reason, the thermally-assisted magnetic recording head needs to be designed to detect in real time the intensity of emitted light from the laser diode, and suppress the variation in the intensity of the emitted light on the basis of the detection results.

A stripe laser diode having a stripe-shaped light propagation path includes a first emission part for emitting forward light and a second emission part for emitting backward light. In the thermally-assisted magnetic recording head, the laser diode having the aforementioned first and second emission parts can be employed as a light source, with the forward light employed as the laser light for generating the near-field light. Then, the intensity of the backward light can be detected to exercise feedback control on the intensity of the emitted light (the forward light and the backward light) from the laser diode on the basis of the detection results.

In order to realize the aforementioned feedback control in thermally-assisted magnetic recording heads, the present inventors have proposed a light source unit that includes a unit substrate having a light source mount surface and incorporating an embedded photodiode, and a laser diode mounted on the light source mount surface of the unit substrate. In the light source unit, the photodiode has a light receiving surface that is located in the same plane as the light source mount surface at such a position as to be able to receive the backward light from the laser diode.

In the thermally-assisted magnetic recording head with the light source unit including the aforementioned photodiode, the reaction speed of the photodiode and the response speed of the feedback control dependent thereon increase with increasing amount of light received by the photodiode. Therefore, in order to increase the response speed of the feedback control, it is necessary to allow the photodiode to receive an increased amount of light. For the aforementioned light source unit, however, the center of the backward light, which is divergent light, is parallel to the light receiving surface of the photodiode. This allows only part of the backward light to be incident upon the light receiving surface. To be worse, this configuration causes the backward light to be incident upon the light receiving surface at a large incident angle, thereby causing the light receiving surface to exhibit a high reflectivity for the backward light. For these reasons, the amount of light to be received by the photodiode is decreased. In order to enhance the response speed of the feedback control under this situation, it is desirable either to increase the amount of light to be received by the photodiode or to somehow improve the efficiency of photoelectric conversions by the photodiode.

To increase the amount of light to be received by the photodiode, a possible approach is to increase the ratio of the intensity of the backward light to the intensity of the forward light. However, this approach disadvantageously causes a reduction in the intensity of the forward light that is used for generating the near-field light.

Another possible approach to increasing the amount of light to be received by the photodiode is to increase the size of the photodiode. In thermally-assisted magnetic recording heads, however, the photodiode cannot be greatly increased in size because the light source unit to be secured on the slider should not be large. It is thus difficult to increase the amount of light to be received by the photodiode by increasing the size of the photodiode.

JP-A-2010-225798 discloses a technique where a surface plasmon resonance (SPR) inducing area made of, for example, a matrix-shaped metal film, is provided on the surface or inside of a photoelectric conversion semiconductor device (solar battery). The SPR inducing area induces surface plasmon resonance to generate photoelectric field enhancement effects. This technique aims to improve the efficiency of photoelectric conversions in the near-infrared region of the solar battery.

However, according to the technique disclosed in JP-A-2010-225798, the SPR inducing area is not intended to receive light incident thereon in a particular direction, such as the backward light which impinges on the light receiving surface of the photodiode in the light source unit having the aforementioned photodiode.

OBJECTS AND SUMMARY OF THE INVENTION

A first object of the present invention is to provide a light source unit including a light source and a photodetector that detects emitted light from the light source, the light source unit being capable of increasing the amount of light to be received by the photodetector.

A second object of the present invention is to provide a thermally-assisted magnetic recording head that includes a light source and a photodetector and is capable of increasing the response speed of the control of the intensity of emitted light from the light source, and to provide a head gimbal assembly and a magnetic recording device in which the thermally-assisted magnetic recording head is incorporated.

A light source unit of the present invention includes a light source and a photodetector. A thermally-assisted magnetic recording head of the present invention includes a slider, and a light source and a photodetector that are mounted on the slider. In the light source unit or the thermally-assisted magnetic recording head of the present invention, the light source has an emission part for emitting light. The photodetector has a light receiving surface for receiving the light emitted from the emission part, and detects the light. The light source unit or the thermally-assisted magnetic recording head of the present invention further includes a grating that is made of metal and disposed to extend along the light receiving surface. The grating includes a plurality of line-shaped portions that each extend in a direction intersecting a direction of travel of the light and that are located at positions different from each other along the direction of travel of the light.

The light source unit or the thermally-assisted magnetic recording head of the present invention is configured to allow the light emitted from the emission part to be incident upon the grating, so that a surface plasmon is excited on the grating, and near-field light is generated based on the surface plasmon. The near-field light is detected by the photodetector.

In the light source unit of the present invention, the light source may have a first emission part for emitting forward light and a second emission part for emitting backward light. The light receiving surface may receive the backward light.

In the thermally-assisted magnetic recording head of the present invention, the light source and the photodetector may be unitized to be mounted on the slider. The light source may have a first emission part for emitting forward light and a second emission part for emitting backward light. The light receiving surface may receive the backward light. The slider may include: a medium facing surface that faces a magnetic recording medium; a magnetic pole that has an end face located in the medium facing surface and generates a write magnetic field for writing data on the magnetic recording medium; a waveguide through which light propagates; and a plasmon generator that allows a surface plasmon to be excited thereon based on the light propagating through the waveguide and that generates near-field light from the medium facing surface based on the surface plasmon.

In the light source unit or the thermally-assisted magnetic recording head of the present invention, the light source may be a laser diode.

In the light source unit or the thermally-assisted magnetic recording head of the present invention, the photodetector may be a photodiode. In this case, the photodiode may include a plurality of semiconductor layers stacked one on another, and an interface between two of the semiconductor layers, the interface creating a depletion layer contributing to photoelectric conversion. The grating may have a top surface that is farthest from the light receiving surface. A maximum distance between the top surface of the grating and the interface in a direction perpendicular to the light receiving surface may be greater than 5 nm and equal to or smaller than 400 nm.

In the light source unit or the thermally-assisted magnetic recording head of the present invention, the grating may have a thickness in the range of 5 to 200 nm.

In the light source unit or the thermally-assisted magnetic recording head of the present invention, the metal of which the grating is made may be one of Au, Ag, Al, Pd, Pt, Mg, Cu, In, Rh, Ir, and Ru, or an alloy composed of two or more of these materials.

In the light source unit or the thermally-assisted magnetic recording head of the present invention, the light source unit may further include a unit substrate having a light source mount surface. In this case, the light source is mounted on the light source mount surface. The photodetector may be embedded in the unit substrate.

In the light source unit or the thermally-assisted magnetic recording head of the present invention, the light emitted from the emission part may be divergent light. The plurality of line-shaped portions may include a plurality of curved-line-shaped portions that are convex toward the direction of travel of the light. In this case, two or more of the curved-line-shaped portions may increase or decrease in radius of curvature with increasing distance from the emission part. Alternatively, the plurality of curved-line-shaped portions may include a plurality of first curved-line-shaped portions that decrease in radius of curvature with increasing distance from the emission part, and a plurality of second curved-lineshaped portions that increase in radius of curvature with increasing distance from the emission part. The second curved-line-shaped portions are located farther from the emission part than are the first curved-line-shaped portions.

A head gimbal assembly of the present invention includes the thermally-assisted magnetic recording head of the present invention and a suspension that supports the thermally-assisted magnetic recording head. A magnetic recording device of the present invention includes: a magnetic recording medium; the thermally-assisted magnetic recording head of the present invention; a positioning device that supports the thermally-assisted magnetic recording head and positions the same with respect to the magnetic recording medium; and a control circuit that controls the intensity of the light emitted from the emission part based on a detection result provided by the photodetector.

According to the light source unit of the present invention, as described above, the light emitted from the emission part of the light source is incident upon the grating, whereby surface plasmons are excited on the grating, and near-field light is generated based on the surface plasmons. The near-field light is detected by the photodetector. The grating of the present invention includes a plurality of line-shaped portions that each extend in a direction intersecting the direction of travel of the light and that are located at positions different from each other along the direction of travel of the light. Such a grating allows surface plasmons to be excited efficiently based on the light. Consequently, the present invention allows an increased amount of light to be received by the photodetector, as compared with a case without the grating.

According to the thermally-assisted magnetic recording head, the head gimbal assembly or the magnetic recording device of the present invention, it is possible to increase the amount of light to be received by the photodetector as mentioned above. This makes it possible to increase the response speed of the control of the intensity of emitted light from the light source.

Other and further objects, features and advantages of the present invention will appear more fully from the following description.

DETAILED DESCRIPTION OF THE PREFERRED EMBODIMENTS

First Embodiment

Figure 11:
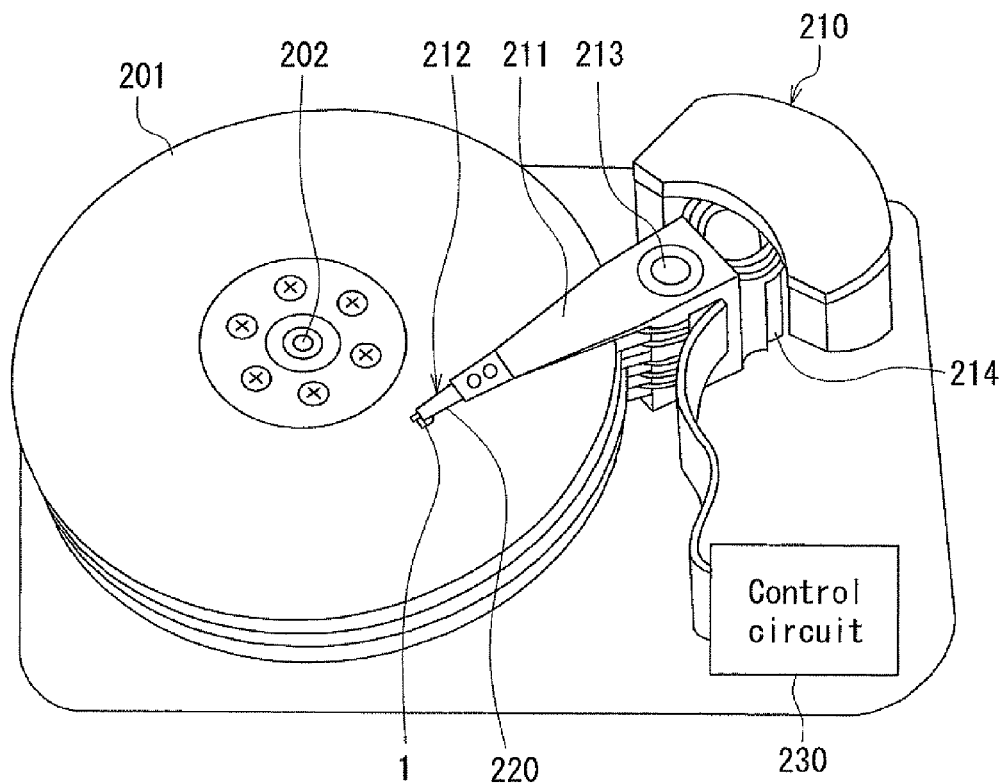
FIG. 11 is a perspective view showing a magnetic recording device according to the first embodiment of the invention.

Preferred embodiments of the present invention will now be described in detail with reference to the drawings. First, reference is made to FIG. 11 to describe a magnetic disk drive as a magnetic recording device according to a first embodiment of the invention. As shown in FIG. 11, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read and write operations of the thermally-assisted magnetic recording heads 1 and also controls the light emitting operation of a light source serving to generate laser light for thermally-assisted magnetic recording. The control circuit 230 of the present embodiment has a particular function for controlling the intensity of emitted light from the light source based on a detection result provided by a photodetector which will be described later.

Figure 12:
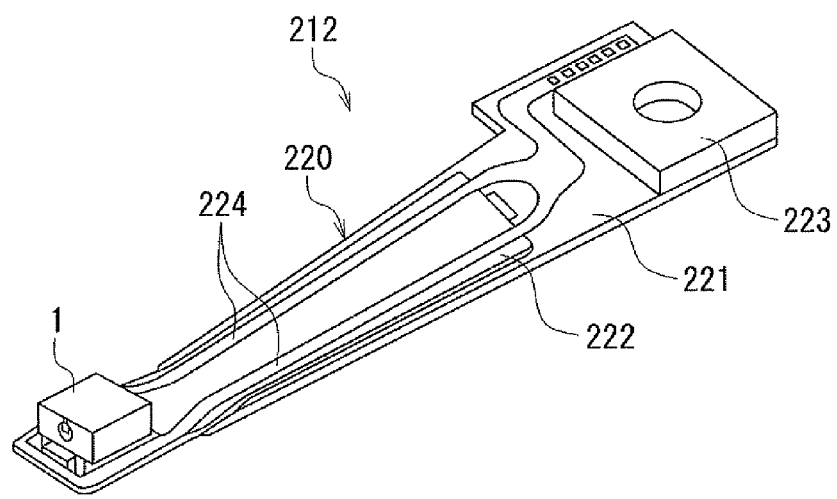
FIG. 12 is a perspective view showing a head gimbal assembly according to the first embodiment of the invention.

FIG. 12 is a perspective view showing the head gimbal assembly 212 of FIG. 11. As previously described, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 12. For example, the head gimbal assembly of the present invention may have an IC chip for driving the head that is mounted somewhere along the suspension 220.

Figure 6:
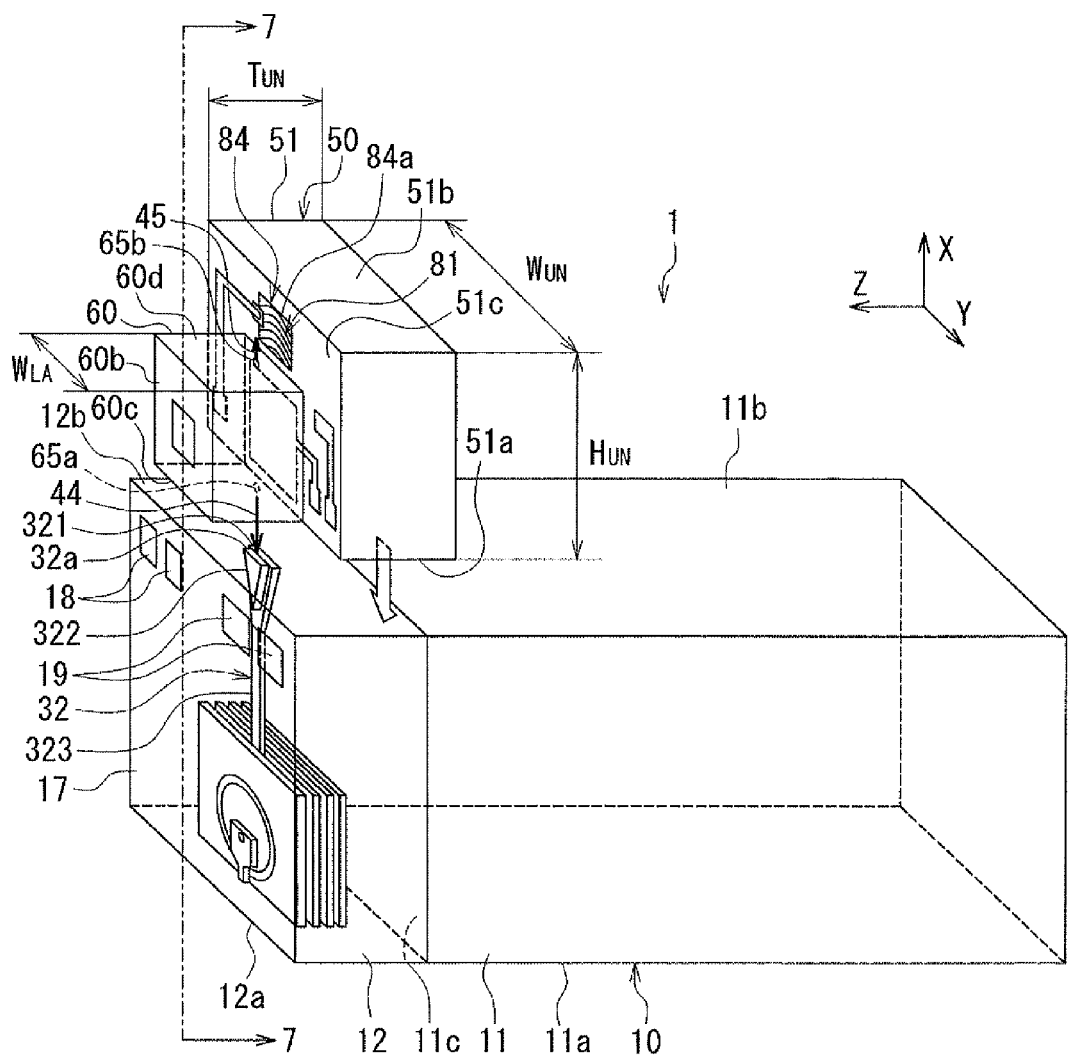
FIG. 6 is a perspective view showing a thermally-assisted magnetic recording head according to the first embodiment of the invention.
Figure 7:
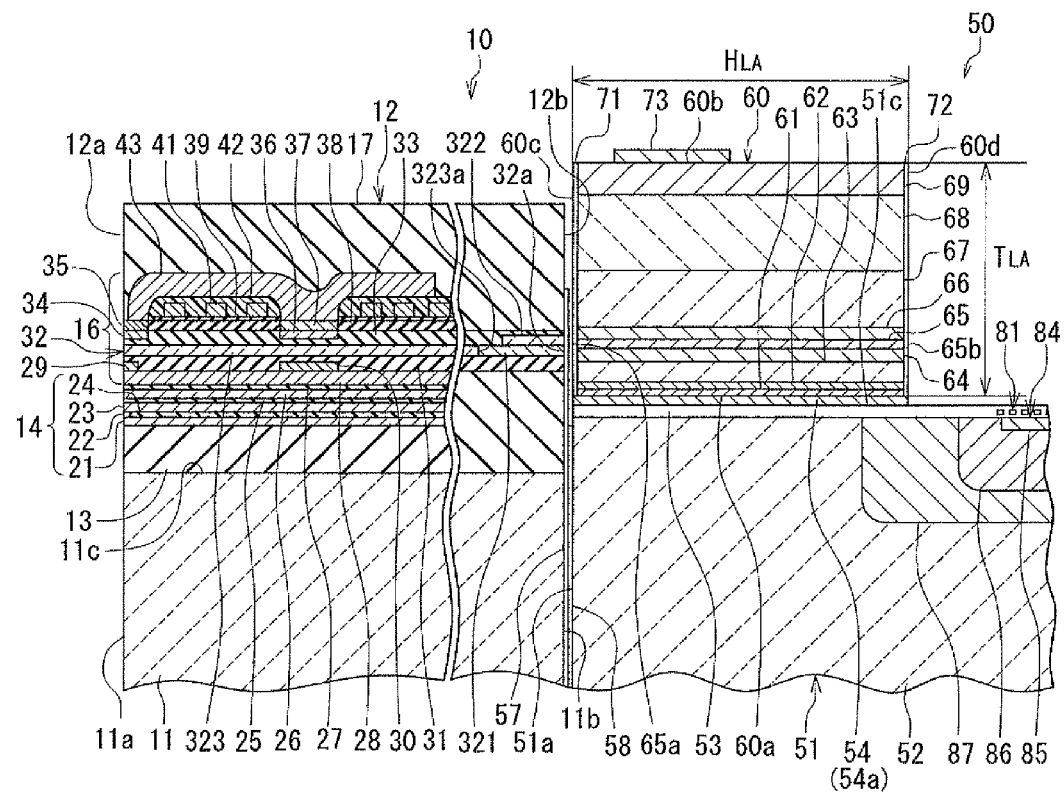
FIG. 7 shows a cross section taken along line 7-7 of FIG. 6.
Figure 8:
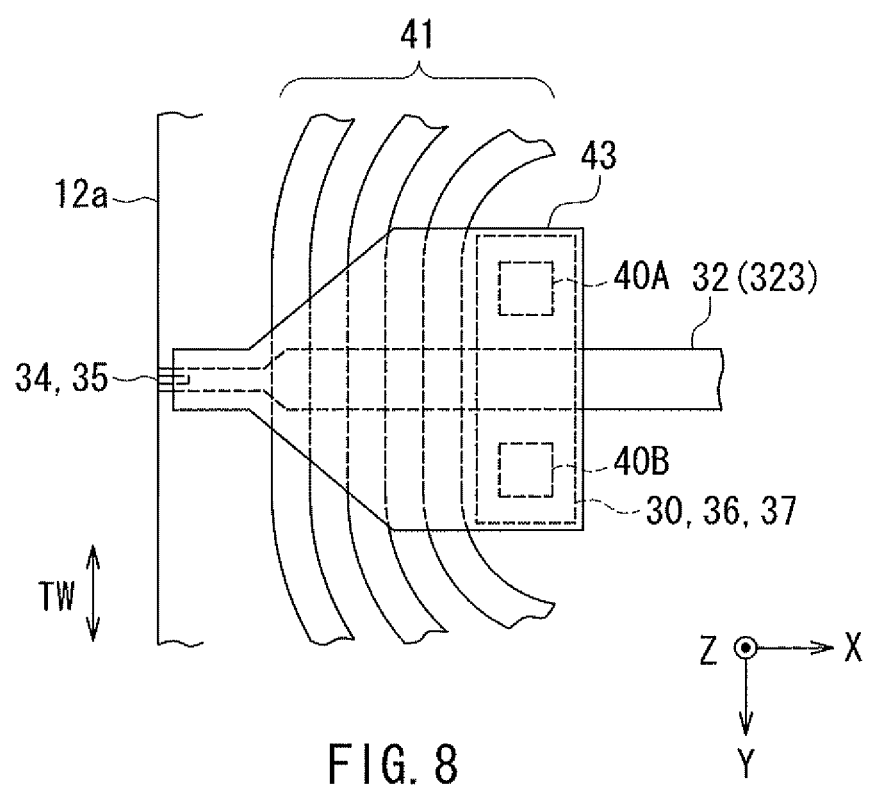
FIG. 8 is a plan view showing a part of a head unit of the thermally-assisted magnetic recording head according to the first embodiment of the invention.

The configuration of the thermally-assisted magnetic recording head 1 according to the present embodiment will now be described with reference to FIG. 6 to FIG. 8. FIG. 6 is a perspective view of the thermally-assisted magnetic recording head 1. FIG. 7 shows a cross section taken along line 7-7 of FIG. 6. FIG. 8 is a plan view showing a part of a head unit of the thermally-assisted magnetic recording head 1. The thermally-assisted magnetic recording head 1 includes a slider 10, and a light source and a photodetector that are mounted on the slider 10. The light source and the photodetector may be mounted on the slider 10 in a manner such that the light source and the photodetector are directly disposed on the slider 10 or alternatively the light source and the photodetector are unitized to be mounted on the slider 10. Now, taking the latter as an example, a description will be made about the configuration of the thermally-assisted magnetic recording head 1. In this example, the light source and the photodetector are unitized into a light source unit 50, which is secured onto the slider 10. FIG. 6 shows a state where the slider 10 and the light source unit 50 are separated from each other.

The slider 10 includes a slider substrate 11 and a head unit 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 from the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that extends perpendicular to the element-forming surface 11c and away from the element-forming surface lie is defined as "above", and a position located in a direction opposite to the aforementioned direction is defined as "below". Where the layers included in the head unit 12 are concerned, the surface closer to the element-forming surface lie is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 7. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is parallel to the Y direction.

The light source unit 50 includes a light source 60 and a photodetector 84. The light source 60 has an emission part for emitting light. The photodetector 84 has a light receiving surface for receiving the light emitted from the emission part, and detects the light. In the present embodiment the light source 60 has, in particular, a first emission part 65a for emitting forward light 44 and a second emission part 65b for emitting backward light 45. The backward light 45 is emitted toward a direction opposite to the direction of the forward light 44. As will be described in detail later, the light source 60 of the present embodiment is a laser diode. Therefore, both the forward light 44 and the backward light 45 are laser light. The forward light 44 is supplied to the slider 10 and used to generate near-field light that is used for thermally-assisted magnetic recording. The photodetector 84 has a light receiving surface 84a for receiving the backward light 45 emitted from the second emission part 65a, and detects the backward light 45.

The light source unit 50 further includes a unit substrate 51 that is in the shape of a rectangular solid and supports the light source 60. The unit substrate 51 has a bond surface 51a, a rear surface 51b opposite to the bond surface 51a, and four surfaces connecting the bond surface 51a to the rear surface 51b. One of the four surfaces connecting the bond surface 51a to the rear surface 51b is a light source mount surface 51c. The bond surface 51a is the surface to be bonded to the rear surface 11b of the slider substrate 11. When in the state shown in FIG. 6 and FIG. 7, the light source mount surface 51c is perpendicular to the bond surface 51a and parallel to the element-forming surface 11c. The light source unit 50 and its components will be described, where appropriate, with respect to the X direction, the Y direction, the Z direction, the −X direction, the −Y direction, and the −Z direction defined above. In that case, the state shown in FIG. 6 and FIG. 7 shall be the reference state. Where the components of the light source unit 50 are concerned, a position located in the Z direction relative to a reference position will be defined as "above", and a position located in the opposite direction will be defined as "below".

The light source 60 is mounted on the light source mount surface 51c. The photodetector 84 is embedded in the unit substrate 51. The unit substrate 51 may function as a heat sink for dissipating heat generated by the light source 60, as well as serving to support the light source 60. The light source unit 50 further includes a grating 81 disposed to extend along the light receiving surface 84a. The light source 60, the photodetector 84, the grating 81, and the unit substrate 51 will be described in more detail later.

As shown in FIG. 7, the head unit 12 includes an insulating layer 13 disposed on the element-forming surface 11c, and includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 functions to shield the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head 16 further includes a waveguide including a core 32 and a clad. The clad includes a clad layer 31 and a clad layer 33. The clad layer 31 covers the bottom yoke layer 28, the bottom shield layer 29 and the coupling layer 30. The core 32 lies on the clad layer 31. The clad layer 33 covers the clad layer 31 and the core 32. The core 32 extends in the direction perpendicular to the medium facing surface 12a (the X direction). The core 32 has an incidence end 32a, and a front end face opposite thereto. The core 32 allows laser light, i.e., the forward light 44 having been emitted from the first emission part 65a of the light source 60 and incident upon the incidence end 32a, to propagate therethrough.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes a plasmon generator 34 disposed above the core 32 in the vicinity of the medium facing surface 12a, and a magnetic pole 35 disposed at such a position that the plasmon generator 34 is interposed between the magnetic pole 35 and the core 32. The plasmon generator 34 is made of a conductive material such as metal. For example, the plasmon generator 34 may be made of one of Au, Ag, Al, Pd, Pt, Mg, Cu, In, Rh, Ir, and Ru, or an alloy composed of two or more of these materials. The magnetic pole 35 is made of a soft magnetic material, or a magnetic metal material in particular. The configurations and arrangement of the core 32, the plasmon generator 34 and the magnetic pole 35 will be detailed later.

The write head 16 further includes a coupling layer 36 embedded in the clad layer 33 at a position away from the medium facing surface 12a, and a coupling layer 37 lying on the coupling layer 36. The coupling layers 36 and 37 are located above the coupling layer 30. The coupling layers 36 and 37 are each made of a soft magnetic material.

As shown in FIG. 8, the write head 16 further includes two coupling portions 40A and 40B embedded in the clad layers 31 and 33. The coupling portions 40A and 40B are each made of a soft magnetic material. The coupling portions 40A and 40B are located on opposite sides of the core 32 in the track width direction TW, each at a distance from the core 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the magnetic pole 35, the insulating layer 42 and the coupling layer 37. The top yoke layer 43 is in contact with the top surface of the magnetic pole 35 at a position near the medium facing surface 12a, and in contact with the top surface of the coupling layer 37 at a position away from the medium facing surface 12a. The top yoke layer 43 is made of a soft magnetic material.

In the write head 16, a magnetic path for passing a magnetic flux corresponding to the magnetic field produced by the coil 41 is formed by the bottom shield layer 29, the bottom yoke layer 28, the coupling layer 30, the coupling portions 40A and 40B, the coupling layers 36 and 37, the top yoke layer 43, and the magnetic pole 35. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 captures a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 7, the protection layer 17 is disposed to cover the write head 16. As shown in FIG. 6, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to four of the plurality of pad-shaped terminals of the wiring member 224 shown in FIG. 12.

Now, the core 32 will be described in more detail with reference to FIG. 6 and FIG. 7. The core 32 has a first propagation part 321 extending in the −X direction from the rear surface 12b to a predetermined position not reaching the medium facing surface 12a, a second propagation part 322 stacked on the first propagation part 321, and a third propagation part 323 extending in the −X direction from the aforementioned predetermined position to be continuous with the first propagation part 321.

The first propagation part 321 has an incidence end face located in the rear surface 12b, an emitting end face opposite to the incidence end face, a top surface, a bottom surface, and two side surfaces. The incidence end face and the emitting end face of the first propagation part 321 are rectangular in shape, for example. The incidence end face of the first propagation part 321 constitutes a part of the incidence end 32a of the core 32. The width of the first propagation part 321 in the Y direction decreases toward the emitting end face. Each of the top and bottom surfaces of the first propagation part 321 is in the shape of a trapezoid with the side closer to the medium facing surface 12a (the upper base) shorter than the side located in the rear surface 12b (the lower base).

The second propagation part 322 is located on the top surface of the first propagation part 321. The second propagation part 322 has an incidence end face located in the rear surface 12b, an edge part opposite to the incidence end face, a top surface, a bottom surface in contact with the top surface of the first propagation part 321, and two side surfaces. The incidence end face of the second propagation part 322 is rectangular in shape, for example. The incidence end face of the second propagation part 322 constitutes another part of the incidence end 32a of the core 32. The edge part is defined by the two side surfaces intersecting each other. The edge part is located closer to the rear surface 12b than is the emitting end face of the first propagation part 321. The width of the second propagation part 322 in the Y direction decreases toward the edge part. Each of the top and bottom surfaces of the second propagation part 322 is in the shape of a triangle with its vertex oriented toward the medium facing surface 12a.

For example, the first and second propagation parts 321 and 322 are both rectangular in cross section parallel to the rear surface 12b. The thickness (dimension in the Z direction) of each of the first and second propagation parts 321 and 322 is constant or almost constant regardless of the distance from the rear surface 12b. The second propagation part 322 is smaller than the first propagation part 321 in length in the X direction.

The width of the first propagation part 321 in the rear surface 12b falls within the range of 1 to 10 μm, for example. The total thickness of the first and second propagation parts 321 and 322 falls within the range of 1 to 10 μm, for example.

The third propagation part 323 has an incidence end face 323a connected to the emitting end face of the first propagation part 321, and a front end face opposite to the incidence end face 323a. The incidence end face 323a and the front end face are rectangular in shape, for example.

Figure 9:
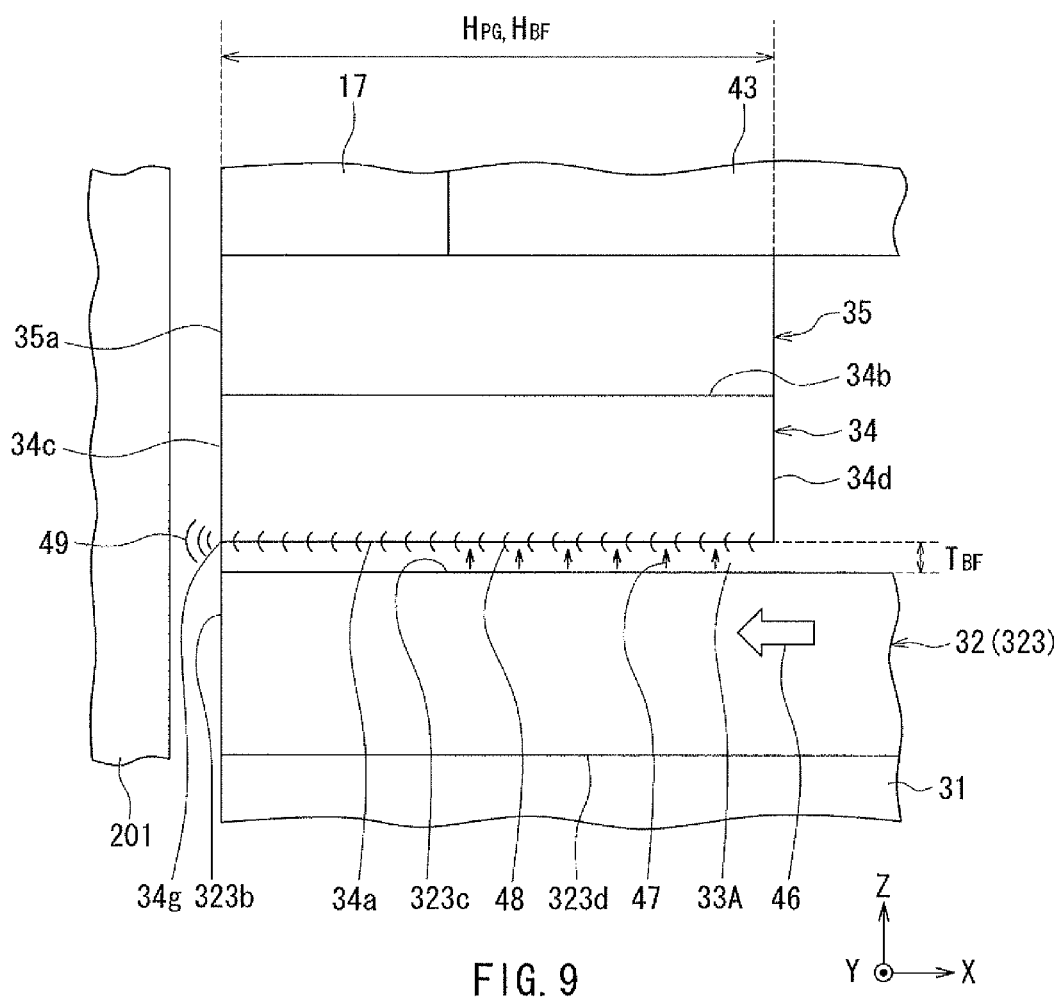
FIG. 9 is a cross-sectional view showing a core, a plasmon generator, and a magnetic pole of the thermally-assisted magnetic recording head according to the first embodiment of the invention.

Reference is now made to FIG. 9 to describe an example of configurations and arrangement of the core 32 (the third propagation part 323), the plasmon generator 34, and the magnetic pole 35. FIG. 9 is a cross-sectional view showing the core 32 (the third propagation part 323), the plasmon generator 34, and the magnetic pole 35.

In the example shown in FIG. 9, the third propagation part 323 has the front end face 323b, an evanescent light generating surface 323c which is a top surface, a bottom surface 323d, and two side surfaces (not shown), as well as the incidence end face 323a shown in FIG. 7. The front end face 323b is also the front end face of the core 32. The front end face 323b is rectangular in shape, for example. The evanescent light generating surface 323c generates evanescent light based on the light propagating through the third propagation part 323.

In the example shown in FIG. 9, the plasmon generator 34 has a near-field light generating edge 34g located in the medium facing surface 12a. The plasmon generator 34 is in the shape of a triangular prism having an outer surface as described below. The outer surface of the plasmon generator 34 includes a propagative edge 34a, a top surface 34b, and first and second inclined surfaces (not shown). The propagative edge 34a faces the evanescent light generating surface 323c with a predetermined distance therefrom, and extends in a direction perpendicular to the medium facing surface 12a. As will be described later, the propagative edge 34a allows plasmons to propagate. The near-field light generating edge 34g lies at an end of the propagative edge 34a. Although not shown, each of the first and second inclined surfaces is connected to the propagative edge 34a, and the distance between the first and second inclined surfaces increases with increasing distance from the propagative edge 34a. The top surface 34b connects the respective top ends of the first and second inclined surfaces to each other. For example, an angle of 30 to 120 degrees is formed between the first and second inclined surfaces.

The outer surface of the plasmon generator 34 further includes a front end face 34c located in the medium facing surface 12a, and a rear end face 34d opposite to the front end face 34c. Each of the front end face 34c and the rear end face 34d connects the first inclined surface, the second inclined surface, and the top surface 34b to each other. The front end face 34c is triangular in shape, for example. One of the vertexes of the front end face 34c lies at an end of the propagative edge 34a. This vertex constitutes the near-field light generating edge 34g.

In the example shown in FIG. 9, the distance between the propagative edge 34a and the top surface 34b is constant or almost constant regardless of the distance from the medium facing surface 12a. The width of the top surface 34b in the Y direction is constant or almost constant regardless of the distance from the medium facing surface 12a.

As shown in FIG. 9, the part of the clad layer 33 interposed between the evanescent light generating surface 323c and the propagative edge 34a forms a buffer part 33A having a refractive index lower than that of the core 32.

In the example shown in FIG. 9, the magnetic pole 35 is disposed at such a position that the plasmon generator 34 is interposed between the magnetic pole 35 and the third propagation part 323. The magnetic pole 35 has an end face 35a located in the medium facing surface 12a. The end face 35a is rectangular in shape, for example. The bottom surface of the magnetic pole 35 is in contact with the top surface 34b of the plasmon generator 34.

The width of the third propagation part 323 in the track width direction TW (the Y direction) in the vicinity of the plasmon generator 34 falls within the range of 0.3 to 0.7 μm, for example. The thickness (dimension in the Z direction) of the third propagation part 323 in the vicinity of the plasmon generator 34 falls within the range of 0.3 to 0.7 μm, for example.

The dimension of the plasmon generator 34 in the track width direction TW (the Y direction) at the medium facing surface 12a and the dimension of the plasmon generator 34 in the Z direction at the medium facing surface 12a are both sufficiently smaller than the wavelength of laser light (the forward light 44) propagating through the core 32. Both of these dimensions fall within the range of 10 to 100 nm, for example. As shown in FIG. 9, the length of the plasmon generator 34 in the X direction will be symbolized by $H_{PG}$. $H_{PG}$ falls within the range of 0.6 to 4.0 μm, for example.

As shown in FIG. 9, the X-direction length of a portion of the propagative edge 34a of the plasmon generator 34, the portion facing the evanescent light generating surface 323c, will be symbolized by $H_{BF}$. As shown in FIG. 9, the distance between the propagative edge 34a and the evanescent light generating surface 323c will be symbolized by $T_{BF}$. Both $H_{BF}$ and $T_{BF}$ are important parameters in achieving appropriate excitation and propagation of surface plasmons. $H_{BF}$ preferably falls within the range of 0.6 to 4.0 μm, and is preferably greater than the wavelength of the laser light (the forward light 44) propagating through the core 32. In the example shown in FIG. 9, the front end face 323b of the third propagation part 323 is exposed in the medium facing surface 12a, so that $H_{BF}$ is equal to $H_{PG}$. $T_{BF}$ preferably falls within the range of 10 to 100 nm. The distance between the near-field light generating edge 34g of the plasmon generator 34 and the front end face 323b of the third propagation part 323 is equal to $T_{BF}$.

The configurations and arrangement of the core 32 (the third propagation part 323), the plasmon generator 34 and the magnetic pole 35 are not limited to the foregoing example described with reference to FIG. 9.

The light source unit 50 will now be described in more detail. First, the light source 60 will be described with reference to FIG. 6 and FIG. 7. The light source 60 is in the shape of a rectangular prism and has a plurality of surfaces described below. The light source 60 has a first surface 60a facing the light source mount surface 51c of the unit substrate 51, a second surface 60b opposite to the first surface 60a, a front end face 60c facing the incidence end 32a of the core 32, a rear end face 60d opposite to the front end face 60c, and two side surfaces. When in the state where the light source 60 is mounted on the light source mount surface 51c, the first surface 60a and the second surface 60b are parallel to the light source mount surface 51c, and the front end face 60c and the rear end face 60d are parallel to the bond surface 51a. The front end face 60c includes the first emission part 65a which emits the forward light 44. The rear end face 60d includes the second emission part 65b which emits the backward light 45. The distance between the first surface 60a and the second emission part 65b is smaller than that between the second surface 60b and the second emission part 65b.

Now, with reference to FIG. 7, a description will be given of a specific example of configuration of the light source 60. For example, the light source 60 is an edge-emitting stripe laser diode. In the following description, the light source 60 will be referred to as laser diode 60. The laser diode 60 has a multi-layer structure in which a p-electrode 61, a p-electrode underlayer 62, a p-clad layer 63, a first guide layer 64, an active layer 65, a second guide layer 66, an n-clad layer 67, an n-substrate 68, and an n-electrode 69 are arranged in this order from the first surface 60a. The two cleavage planes of the aforementioned multi-layer structure are coated with reflection layers 71 and 72 of $SiO_2$, $Al_2O_3$ or the like for totally reflecting light to induce oscillation. The first surface 60a and the second surface 60b are located at opposite ends in a direction perpendicular to the plane of the active layer 65. The first surface 60a is formed of the surface of the p-electrode 61. The second surface 60b is formed of the surface of the n-electrode 69. The front end face 60c is formed of the surface of the reflection layer 71. The rear end face 60d is formed of the surface of the reflection layer 72.

Although not illustrated, the laser diode 60 has a stripe-shaped light propagation path that includes part of the active layer 65 and extends in a direction perpendicular to the front end face 60c and the rear end face 60d. The laser diode having such a stripe-shaped light propagation path is called a stripe laser diode. There are various methods available for forming the stripe-shaped light propagation path of the stripe laser. The first emission part 65a is located at the end of the light propagation path closer to the front end face 60c. The second emission part 65b is located at the end of the light propagation path closer to the rear end face 60d. The emission parts 65a and 65b emit laser light (the forward light 44 and the backward light 45) in directions opposite to each other and parallel to the plane of the active layer 65. Such a laser diode that emits laser light in a direction parallel to the plane of the active layer 65 is called an edge-emitting laser diode. The laser diode 60 preferably allows the first and second emission parts 65a and 65b to emit polarized light of TM-mode whose electric field oscillates in a direction perpendicular to the plane of the active layer 65. The laser diode 60 of the present embodiment can be formed into various configurations without being limited to the configuration shown in FIG. 7.

As shown in FIG. 6, the forward light 44 emitted from the first emission part 65a is directed toward the incidence end 32a of the core 32 and then incident upon the core 32. The backward light 45 emitted from the second emission part 65b proceeds in the direction opposite to the direction of the forward light 44. The intensity of the backward light 45 is lower than the intensity of the forward light 44 and proportional to the intensity of the forward light 44. For example, the ratio of the intensity of the backward light 45 to the intensity of the forward light 44 is within the range of 2% to 25%.

The laser diode 60 may be a laser diode of InP type, GaAs type, GaN type or the like that is commonly used for such applications as communications, optical disc storage and material analysis. The laser light (the forward light 44 and the backward light 45) to be emitted by the laser diode 60 may have any wavelength within the range of, for example, 375 nm to 1.7 μm. Specifically, the laser diode 60 may be an InGaAsP/InP quaternary mixed crystal laser diode having an emittable wavelength range of 1.2 to 1.67 μm, for example.

The laser diode 60 further has a light source terminal 73 made of a conductive material, disposed on the n-electrode 69 and electrically connected to the n-electrode 69. The light source terminal 73 is electrically connected to one of the plurality of pad-shaped terminals of the wiring member 224 shown in FIG. 12.

As shown in FIG. 6, the width of the laser diode 60 in the Y direction will be symbolized by $W_{LA}$. As shown in FIG. 7, the thickness (dimension in the Z direction) of the laser diode 60 will be symbolized by $T_{LA}$, and the length of the laser diode 60 in the X direction will be symbolized by $H_{LA}$. $W_{LA}$ falls within the range of 150 to 250 μm, for example. $T_{LA}$ falls within the range of 60 to 200 μm, for example. $H_{LA}$ is 300 μm, for example.

Figure 1:
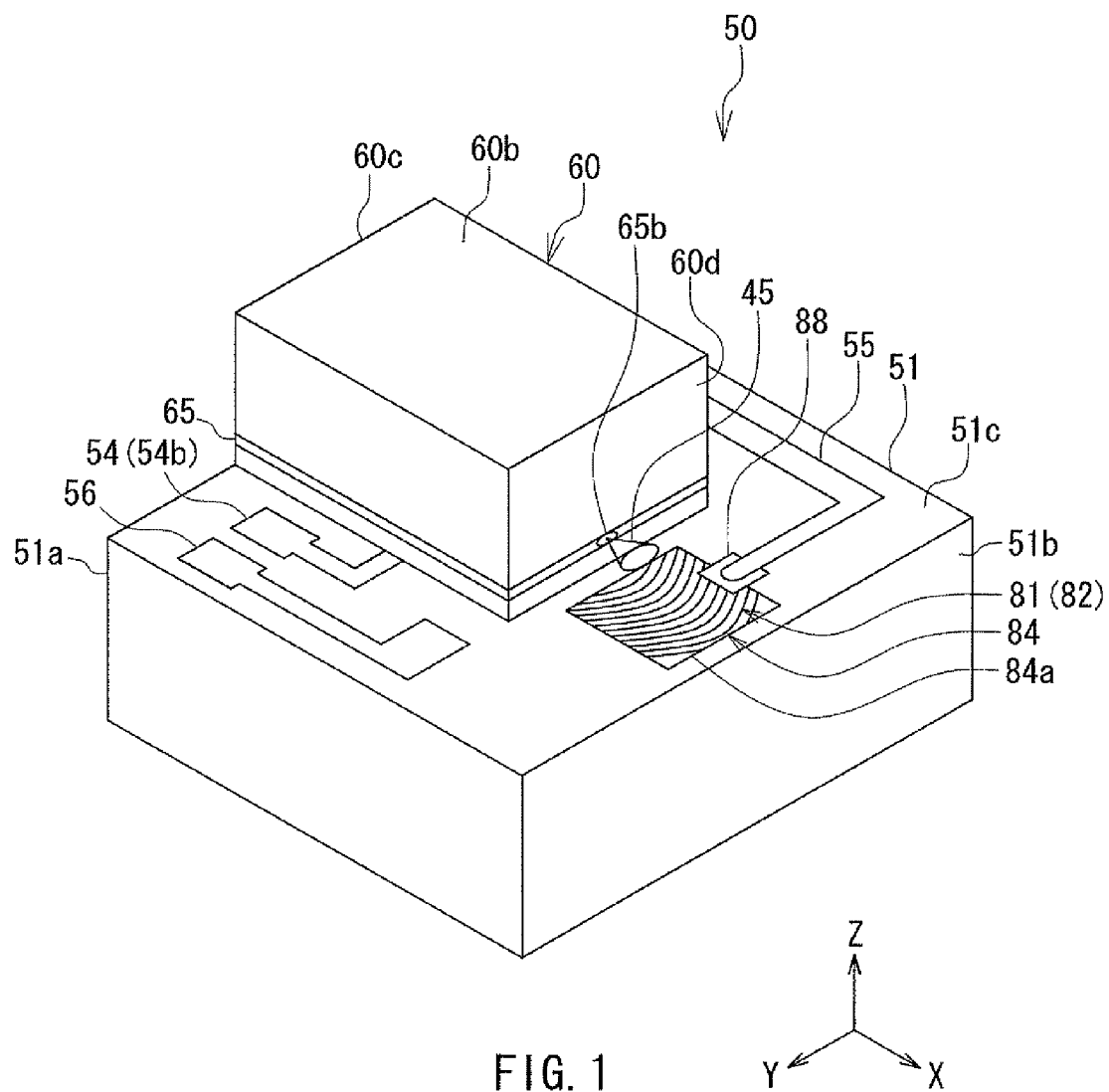
FIG. 1 is a perspective view showing a light source unit according to a first embodiment of the invention.
Figure 2:
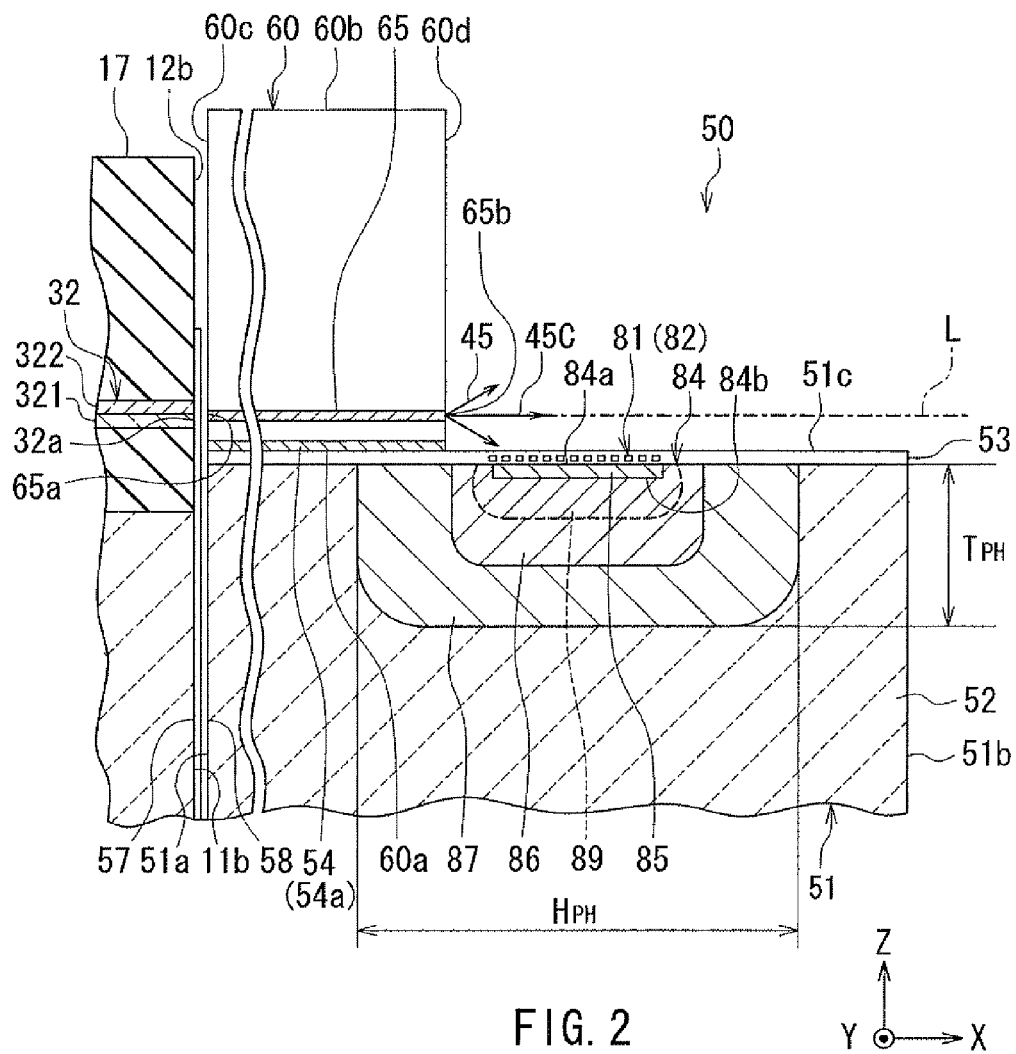
FIG. 2 is a cross-sectional view showing a part of the light source unit according to the first embodiment of the invention.
Figure 10:
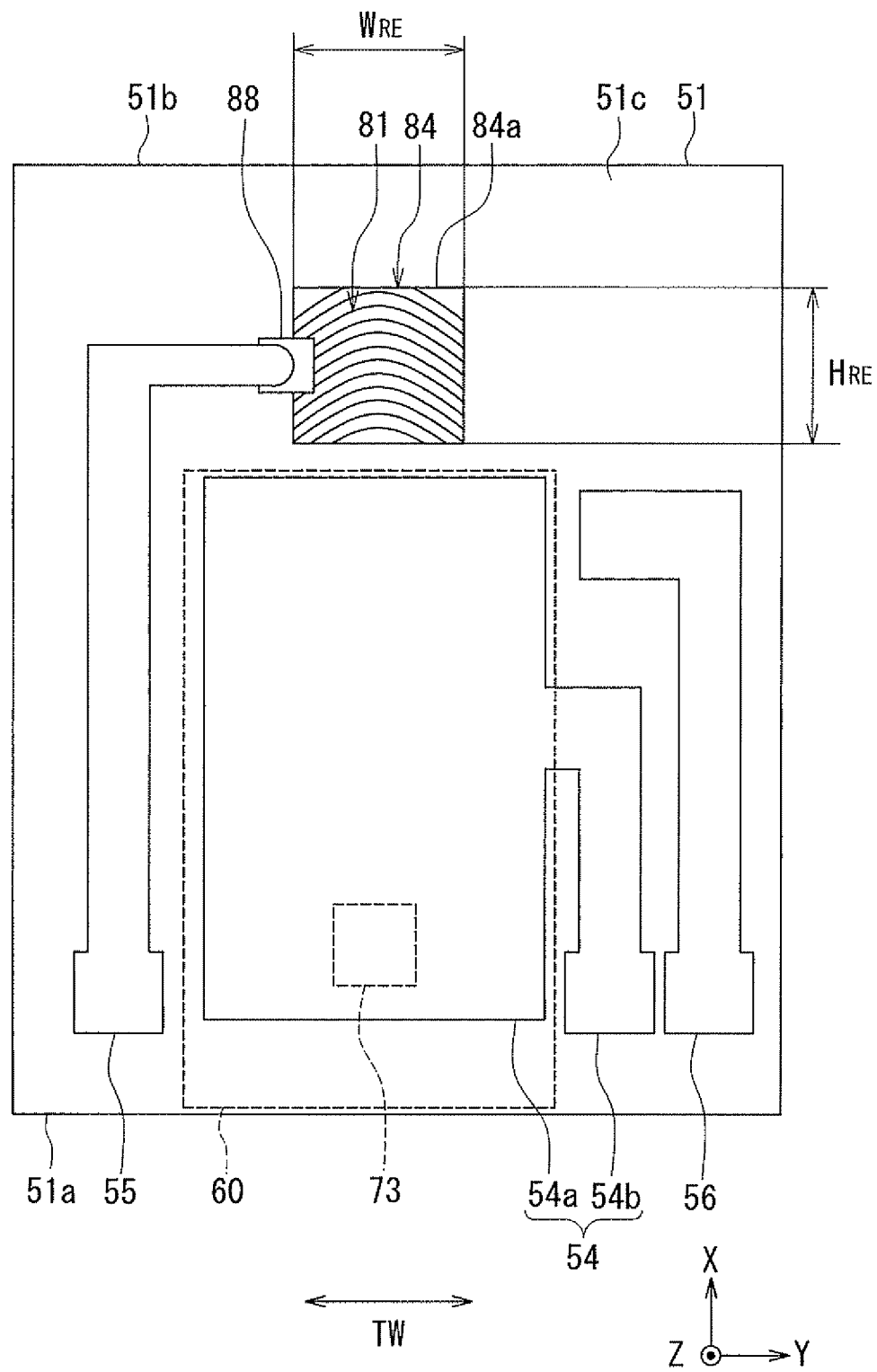
FIG. 10 is a plan view showing a light source mount surface of a unit substrate of the light source unit according to the first embodiment of the invention.

Next, the unit substrate 51 will be described in detail with reference to FIG. 1, FIG. 2, FIG. 6, FIG. 7, and FIG. 10. FIG. 1 is a perspective view showing the light source unit 50. FIG. 2 is a cross-sectional view showing a part of the light source unit 50. FIG. 10 is a plan view showing the light source mount surface 51c of the unit substrate 51. As shown in FIG. 2, the unit substrate 51 includes a substrate body 52 having a top surface, and a protection layer 53 covering the top surface of the substrate body 52. The substrate body 52 is made mainly of a semiconductor material such as Si or GaAs. The protection layer 53 is made of an insulating material such as $SiO_2$ or $Al_2O_3$. Note that the protection layer 53 is not shown in FIG. 1, FIG. 6 and FIG. 10. The unit substrate 51 further includes a light source lead electrode 54, a first detector lead electrode 55, a second detector lead electrode 56, and a p-electrode 88 that are each made of a conductive material and disposed on the protection layer 53. The light source mount surface 51c is composed of the part of the top surface of the protection layer 53 on which the electrodes 54, 55, 56 and 88 are not disposed, and the top surfaces of the electrodes 54, 55, 56 and 88.

The light source lead electrode 54 includes a first portion 54a, and a second portion 54b continuous with the first portion 54a. The first portion 54a is located directly below the laser diode 60 and electrically connected to the p-electrode 61 of the laser diode 60. As shown in FIG. 10, the second portion 54b extends from the first portion 54a to a side of the laser diode 60 (the right side in FIG. 10). The first detector lead electrode 55 is disposed to extend from the left side to the top side relative to the laser diode 60 in FIG. 10. The second detector lead electrode 56 is disposed on the right side relative to the second portion 54b in FIG. 10. As will be described in detail later, the first and second detector lead electrodes 55 and 56 and the p-electrode 88 are electrically connected to the photodetector 84. The electrodes 54, 55 and 56 are electrically connected to three of the plurality of pad-shaped terminals of the wiring member 224 shown in FIG. 12.

The laser diode 60 is secured to the top surface of the first portion 54a, which constitutes the light source mount surface 51c, by bonding the first portion 54a and the p-electrode 61 to each other by such means as soldering. The front end face 60c of the laser diode 60 is located near the ridge between the bond surface 51a and the light source mount surface 51c. The laser diode 60 is supplied with a predetermined voltage via the light source lead electrode 54 and the light source terminal 73.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

As shown in FIG. 6, the width of the unit substrate 51 in the Y direction will be symbolized by $W_{UN}$, the thickness (dimension in the Z direction) of the unit substrate 51 will be symbolized by $T_{UN}$, and the length of the unit substrate 51 in the X direction will be symbolized by $H_{UN}$. $W_{UN}$ is 500 μm, for example. $T_{UN}$ is 300 μm, for example. $H_{UN}$ is sufficiently greater than the length $H_{LA}$ of the laser diode 60 in the X direction. $H_{UN}$ is 450 μm, for example.

The photodetector 84 will now be described in detail with reference to FIG. 1, FIG. 2, and FIG. 10. As mentioned previously, the photodetector 84 has the light receiving surface 84a for receiving the backward light 45 emitted from the second emission part 65b of the laser diode 60, and detects the backward light 45. The photodetector 84 is embedded in the unit substrate 51 (the substrate body 52) such that the light receiving surface 84a is located near the second emission part 65b of the laser diode 60, with the laser diode 60 mounted on the light source mount surface 51c of the unit substrate 51. The light receiving surface 84a is flush with the top surface of the substrate body 52. The light receiving surface 84a is rectangular in shape, for example.

In the present embodiment, the photodetector 84 is specifically a photodiode. In the following description, the photodetector 84 will be referred to as photodiode 84. The photodiode 84 includes a plurality of semiconductor layers stacked one on another, and an interface between two of the semiconductor layers, the interface creating a depletion layer contributing to photoelectric conversions. The photodiode 84 performs photoelectric conversions by incident light reaching the aforementioned depletion layer. Although the position of the boundary between the depletion layer and a region adjacent thereto is difficult to identify, it is possible to identify the position of the interface between two of the semiconductor layers that creates the aforementioned depletion layer. The distance from the light receiving surface 84a to the aforementioned interface is equal to or nearly equal to the distance from the light receiving surface 84a to the depletion layer contributing to photoelectric conversions. Accordingly, in the present embodiment, the aforementioned interface will be referred to as a detection plane (denoted with symbol 84b) in a sense that the plane actually detects light in the photodiode 84.

Now, with reference to FIG. 2, a description will be given of a specific example of configuration of the photodiode 84. In this example, the photodiode 84 has a PIN-diode structure as will be described below. The photodiode 84 includes, as the semiconductor layers stacked one on another, a p-type semiconductor layer 85, an n-type (n+ type) semiconductor layer 87 having a high impurity concentration, and an intrinsic layer 86 disposed between the p-type semiconductor layer 85 and the n-type semiconductor layer 87 and formed of a semiconductor having a very low impurity concentration. The top surface of the p-type semiconductor layer 85 is exposed in the top surface of the substrate body 52. In the region below the top surface of the p-type semiconductor layer 85, there are stacked the n-type semiconductor layer 87, the intrinsic layer 86, and the p-type semiconductor layer 85 in the listed order from below. The intrinsic layer 86 is in contact with the bottom surface and the side surfaces of the p-type semiconductor layer 85. The intrinsic layer 86 has an end face exposed in the top surface of the substrate body 52. This end face surrounds the top surface of the p-type semiconductor layer 85. The n-type semiconductor layer 87 is in contact with the bottom surface and the side surfaces of the intrinsic layer 86. The n-type semiconductor layer 87 has an end face exposed in the top surface of the substrate body 52. This end face surrounds the end face of the intrinsic layer 86.

The substrate body 52 having the photodiode 84 embedded therein can be fabricated by depositing the n-type semiconductor layer 87, the intrinsic layer 86, and the p-type semiconductor layer 85 on a semiconductor wafer by well-known semiconductor process techniques such as photolithography and ion implantation, for example. Alternatively, the substrate body 52 can also be fabricated by embedding a chip-shaped photodiode 84 in a recessed portion formed in a substrate.

The protection layer 53 has a first opening for exposing a part of the top surface of the p-type semiconductor layer 85 and a second opening for exposing a part of the end face of the n-type semiconductor layer 87. The p-electrode 88 is electrically connected to the p-type semiconductor layer 85 through the first opening of the protection layer 53. The first detector lead electrode 55 is electrically connected to the p-electrode 88. The second detector lead electrode 56 is electrically connected to the n-type semiconductor layer 87 through the second opening of the protection layer 53. The photodiode 84 is supplied with a predetermined voltage via the electrodes 55 and 56. This causes the depletion layer 89 contributing to photoelectric conversions to expand in the intrinsic layer 86. In the example shown in FIG. 2, the depletion layer 89 expands so as to cover the bottom surface and the side surfaces of the p-type semiconductor layer 85. The interface between the p-type semiconductor layer 85 and the intrinsic layer 86 corresponds to the interface between two of the semiconductor layers that creates the depletion layer contributing to photoelectric conversion according to the present invention. Accordingly, the interface between the p-type semiconductor layer 85 and the intrinsic layer 86 is the detection plane 84b.

As shown in FIG. 2, the thickness (dimension in the Z direction) of the photodiode 84 will be symbolized by $T_{PH}$, and the length of the photodiode 84 in the X direction will be symbolized by $H_{PH}$. $T_{PH}$ falls within the range of 5 to 50 μm, for example. $H_{PH}$ falls within the range of 50 to 150 μm, for example. The width (not shown) of the photodiode 84 in the Y direction falls within the range of 50 to 150 μm, for example.

As shown in FIG. 10, the width of the light receiving surface 84a in the Y direction will be symbolized by $W_{RE}$, and the length of the light receiving surface 84a in the X direction will be symbolized by $H_{RE}$. $W_{RE}$ falls within the range of 5 to 90 μm, for example. $H_{RE}$ falls within the range of 10 to 130 μm, for example.

Figure 3:
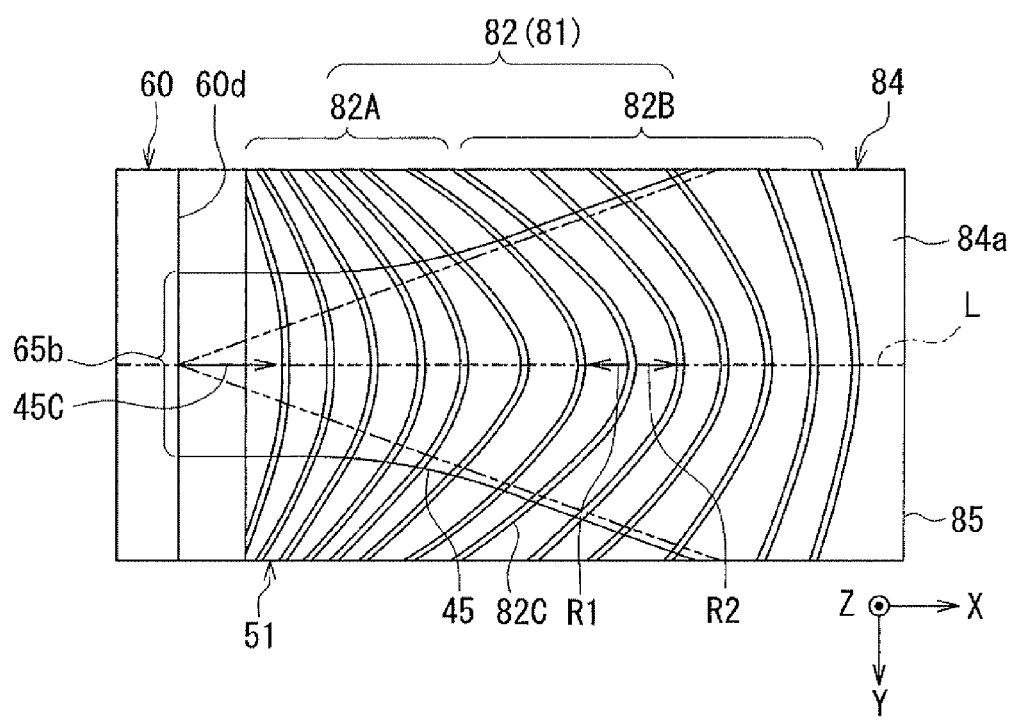
FIG. 3 is a plan view showing a part of the grating shown in FIG. 2.
Figure 4:
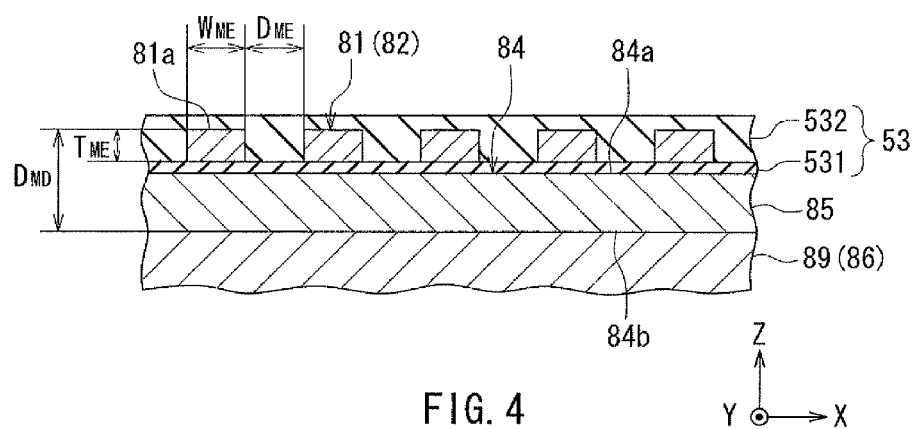
FIG. 4 is a cross-sectional view showing a part of the grating shown in FIG. 2.

The grating 81 will now be described with reference to FIG. 1 to FIG. 4. FIG. 3 is a plan view showing a part of the grating 81 shown in FIG. 2. FIG. 3 does not show the protection layer 53. FIG. 4 is a cross-sectional view showing a part of the grating 81 shown in FIG. 2. FIG. 4 shows a cross section perpendicular to the bond surface 51a and the light source mount surface 51c. As shown in FIG. 4, the protection layer 53 includes, for example, a first layer 531 and a second layer 532 that are stacked in this order on the top surface of the substrate body 52. The grating 81 is disposed to extend along the light receiving surface 84a such that the first layer 531 is interposed between the grating 81 and the light receiving surface 84a. The second layer 532 covers the grating 81 and the first layer 531. The grating 81 may extend along the light receiving surface 84a while being in contact with the light receiving surface 84a. In such a case, the protection layer 53 may consist only of a single layer corresponding to the second layer 532. Thus, the aforementioned configuration where the grating 81 is disposed to extend along the light receiving surface 84a includes a configuration where the grating 81 is in contact with the light receiving surface 84a and a configuration where the grating 81 extends along the light receiving surface 84a without contacting the light receiving surface 84a.

The grating 81 is made of metal. More specifically, the grating 81 is made of metal that is suitable for exciting surface plasmons when irradiated with laser light, i.e., the backward light 45. Specifically, one of Au, Ag, Al, Pd, Pt, Mg, Cu, In, Rh, Ir, and Ru, or an alloy composed of two or more of these materials is used to form the grating 81.

As shown in FIG. 2, the backward light 45 emitted from the second emission part 65b of the laser diode 60 is divergent light, and its center 45C travels in a direction that extends perpendicular to the rear end face 60d of the laser diode 60 and away from the rear end face 60d (the X direction). In the present application, the direction of travel of the center 45C of the backward light 45 is defined as the direction of travel of the backward light 45. The grating 81 includes a plurality of line-shaped portions 82 that each extend in a direction intersecting the direction of travel of the backward light 45 and that are located at positions different from each other along the direction of travel of the backward light 45. As shown in FIG. 4, the line-shaped portions 82 are rectangular, for example, in cross section perpendicular to the direction in which the line-shaped portions 82 extend.

As mentioned above, the line-shaped portions 82 extend in the direction intersecting the direction of travel of the backward light 45. This does not mean that the line-shaped portions 82 intersect the center 45C of the backward light 45 but means that the direction in which the line-shaped portions 82 extend is not parallel to the direction of travel of the backward light 45. Accordingly, the line-shaped portions 82 may or may not intersect the center 45C of the backward light 45.

The line-shaped portions 82 are located at positions different from each other along the direction of travel of the backward light 45. This means that the direction in which the line-shaped portions 82 align is not perpendicular to the direction of travel of the backward light 45. Thus, the direction in which the line-shaped portions 82 align need only be non-perpendicular to the direction of travel of the backward light 45, and may be parallel to or tilted relative to the direction of travel of the backward light 45.

As shown in FIG. 4, the grating 81 has a top surface 81a that is farthest from the light receiving surface 84a. Here, the maximum distance between the top surface 81a and the detection plane 84b in a direction perpendicular to the light receiving surface 84a will be symbolized by $D_{MD}$. As will be described later, the backward light 45 is incident upon the grating 81 to excite surface plasmons on the grating 81, and near-field light is generated based on the surface plasmons. The photodiode 84 detects the near-field light. Accordingly, $D_{MD}$ has to be such a distance that the aforementioned near-field light can reach the depletion layer 89. From this viewpoint, $D_{MD}$ is preferably 400 nm or smaller. $D_{MD}$ is more preferably 200 nm or smaller so that the photodiode 84 can detect near-field light of sufficient intensity.

As shown in FIG. 4, the thickness (dimension in the Z direction) of the grating 81, that is, the thickness (dimension in the Z direction) of individual line-shaped portions 82, will be symbolized by $T_{ME}$. $T_{ME}$ should preferably be of such a value that the line-shaped portions 82 can be prevented from being formed into island-shaped films due to their excessively reduced thickness and that $D_{MD}$ can be prevented from being excessively increased. For example, $T_{ME}$ preferably falls within the range of 5 to 200 nm, and more preferably within the range of 10 to 100 nm. $D_{MD}$ is naturally greater than $T_{ME}$. Accordingly, $D_{MD}$ is preferably greater than 5 nm, and more preferably greater than 10 nm.

As shown in FIG. 4, the width of individual line-shaped portions 82 (the dimension in a direction orthogonal to the Z direction in the cross section perpendicular to the direction in which the line-shaped portions extend) will be symbolized by $W_{ME}$. The distance between two adjacent line-shaped portions 82 will be symbolized by $D_{ME}$. $W_{ME}$ falls within the range of 250 to 1600 nm, for example. $D_{ME}$ falls within the range of 250 to 1600 nm, for example.

In the present embodiment, as shown in FIG. 3, the plurality of line-shaped portions 82 include a plurality of curved-line-shaped portions that are convex toward the direction of travel of the backward light 45, in particular. While the backward light 45 has a wavefront (equiphase wave surface) convex toward the direction of travel of the backward light 45, the plurality of line-shaped portions 82 include a plurality of curved-line-shaped portions convex toward the direction of travel of the backward light 45. This configuration makes it possible to increase the percentage of the backward light 45 that are scattered by the line-shaped portions 82 and have a wave number equal to or nearly equal to the wave number of surface plasmons. As a result, it is possible to efficiently excite surface plasmons based on the backward light 45, and to thereby increase the amount of the near-field light. Two or more of the plurality of curved-line-shaped portions may increase or decrease in radius of curvature with increasing distance from the second emission part 65b. Alternatively, the plurality of curved-line-shaped portions may include a plurality of first curved-line-shaped portions that decrease in radius of curvature with increasing distance from the second emission part 65b, and a plurality of second curved-line-shaped portions that increase in radius of curvature with increasing distance from the second emission part 65b.

In the present embodiment, the plurality of curved-line-shaped portions include first curved-line-shaped portions 82A and second curved-line-shaped portions 82B, in particular. The second curved-line-shaped portions 82B are located farther from the second emission part 65b than are the first curved-line-shaped portions 82A. The first and second curved-line-shaped portions 82A and 82B may be provided with a radius of curvature that corresponds to the radius of curvature of the wavefront (equiphase wave surface) of the backward light 45. Now, this will be described in more detail below.

The backward light 45 is a Gaussian beam, for example. In this case, the radius of curvature of the wavefront of the backward light 45 varies according to the distance from the second emission part 65b. More specifically, as the distance from the second emission part 65b increases, the radius of curvature of the wavefront of the backward light 45 decreases once and then increases. Here, in the plane in which the grating 81 is placed, the region where the radius of curvature of the wavefront of the backward light 45 decreases with increasing distance from the second emission part 65b will be referred to as the first region, denoted with symbol R1. On the other hand, in the plane in which the grating 81 is placed, the region where the radius of curvature of the wavefront of the backward light 45 increases with increasing distance from the second emission part 65b will be referred to as the second region, denoted with symbol R2. Where the radius of curvature varies as mentioned above, the second region R2 is father from the second emission part 65b than is the first region R1. In the example shown in FIG. 3, the position of the boundary between the first region R1 and the second region R2 agrees with the position of the curved-line-shaped portion denoted with symbol 82C.

Of the plurality of curved-line-shaped portions, those located in the first region R1 are the first curved-line-shaped portions 82A, while those located in the second region R2 are the second curved-line-shaped portions 82B. The first curved-line-shaped portions 82A decrease in radius of curvature with increasing distance from the second emission part 65b, like the wavefront of the backward light 45 in the first region R1. The second curved-line-shaped portions 82B increase in radius of curvature with increasing distance from the second emission part 65b, like the wavefront of the backward light 45 in the second region R2. As such, in the present embodiment, variations in radius of curvature of the first and second curved-line-shaped portions 82A and 82B are associated with the variations in radius of curvature of the wavefront of the backward light 45. This configuration allows increasing the percentage of the backward light 45 that are scattered by the plurality of line-shaped portions 82 and have a wave number equal to or nearly equal to the wave number of surface plasmons. It is thus possible to efficiently excite surface plasmons based on the backward light 45, and to thereby increase the amount of the near-field light. For example, the light receiving surface 84a may be located in the region of the backward light 45 where the radius of curvature of the wavefront of the backward light 45 increases with increasing distance from the second emission part 65b. In this case, only the second curved-line-shaped portions 82B may be provided. In the example shown in FIG. 3, the curved-line-shaped portion 82C belongs to both the first curved-line-shaped portions 82A and the second curved-line-shaped portions 82B.

As described above, the plurality of line-shaped portions 82 each extend in the direction intersecting the direction of travel of the backward light 45. It is therefore possible to bring the shape of each line-shaped portion 82 closer to the shape of the wavefront of the backward light 45 near that line-shaped portion 82. More specifically, the radius of curvature of each curved-line-shaped portion included in the plurality of line-shaped portions 82 can be made generally equal to the radius of curvature of the wavefront of the backward light 45 near that curved-line-shaped portion. FIG. 3 shows such an example.

Figure 5:
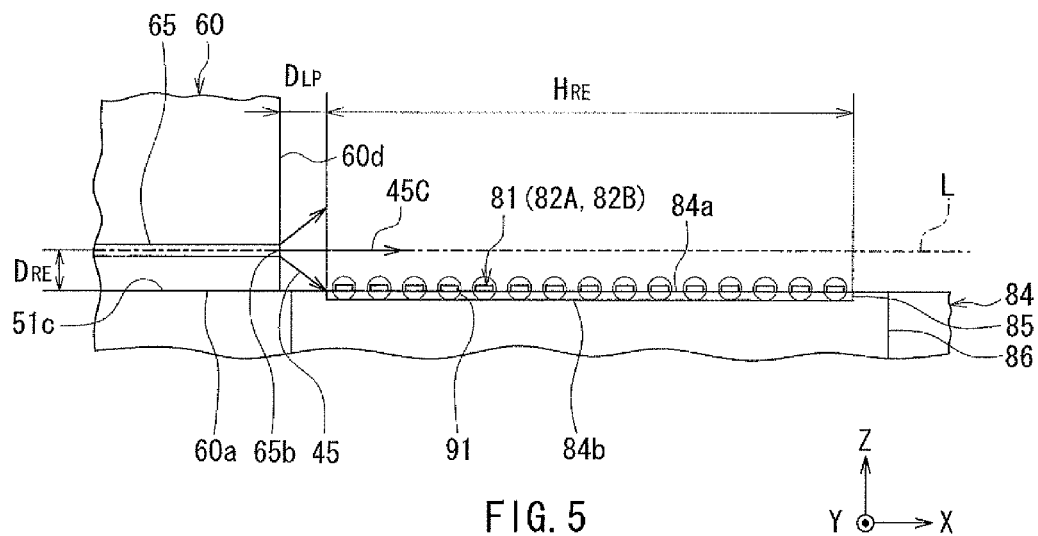
FIG. 5 is an explanatory diagram schematically illustrating the relationship between backward light and a light receiving surface of a photodiode in the light source unit according to the first embodiment of the invention.

Now, with reference to FIG. 2, FIG. 3 and FIG. 5, a description will be given of the relationship between the backward light 45 and the light receiving surface 84a of the photodiode 84. FIG. 5 is an explanatory diagram schematically illustrating the relationship between the backward light 45 and the light receiving surface 84a of the photodiode 84. As described above, the backward light 45 is divergent light. The center 45C of the backward light 45 is parallel to the light source mount surface 51c and the light receiving surface 84a. Here, the symbol L shown in FIG. 2, FIG. 3 and FIG. 5 represents an imaginary straight line including the center 45C of the backward light 45. As typically defined, the beam shape of the backward light 45 is defined as its shape in the plane in which its radiation intensity is $1/e^2$ that at the center 45C. As the distance from the second emission part 65b increases, the beam shape of the backward light 45 gradually approximates a circular cone or elliptic cone (shown by the chain double-dashed lines in FIG. 3) whose vertex falls on a point on the straight line L in the vicinity of the second emission part 65b. Here, the angle which a side of the aforementioned circular cone or elliptic cone forms with the center 45C will be referred to as the angle of divergence. The angle of divergence in an imaginary plane that contains the center 45C and is parallel to the light receiving surface 84a (hereinafter referred to as the horizontal angle of divergence) may be equal to or different from the angle of divergence in an imaginary plane that contains the center 45C and is perpendicular to the light receiving surface 84a (hereinafter referred to as the vertical angle of divergence). In the present embodiment, by way of example, the vertical angle of divergence is assumed to be greater than the horizontal angle of divergence. In this case, for example, the horizontal angle of divergence falls within the range of 6 to 20 degrees, while the vertical angle of divergence falls within the range of 20 to 60 degrees.

The distance from the second emission part 65b to the light source mount surface 51c and the distance from the rear end face 60d to the light receiving surface 84a preferably take on such values that the light receiving surface 84a is covered with the beam of the backward light 45. As shown in FIG. 5, the distance from the second emission part 65b to the light source mount surface 51c will be symbolized by $D_{RE}$. As shown in FIG. 5, the distance from the rear end face 60d to the light receiving surface 84a will be symbolized by $D_{LP}$. For example, $D_{RE}$ is 7 μm and $D_{LP}$ is 5 μm.

Reference is now made to FIG. 6, FIG. 7, and FIG. 9 to describe the principle of generation of near-field light by the plasmon generator 34 and the principle of thermally-assisted magnetic recording using the near-field light generated by the plasmon generator 34. The forward light 44 emitted from the first emission part 65a of the laser diode 60 is incident upon the incidence end 32a of the core 32. The incidence end 32a is composed of the incidence end face of the first propagation part 321 and the incidence end face of the second propagation part 322. The laser light, i.e., the forward light 44 incident upon the incidence end 32a propagates through the first and second propagation parts 321 and 322. The laser light propagating through the second propagation part 322 gradually moves to the first propagation part 321 as it approaches the edge part of the second propagation part 322. The first and second propagation parts 321 and 322 function as a spot size converter for making the spot size of the emitted light smaller than that of the incident light. That is, the laser light propagating through the first and second propagation parts 321 and 322 decreases in beam diameter while propagating through the first and second propagation parts 321 and 322. The first and second propagation parts 321 and 322 may allow the laser light to propagate in a single mode.

The laser light having propagated through the first and second propagation parts 321 and 322 passes through the emitting end face of the first propagation part 321 and the incidence end face 323a of the third propagation part 323. The laser light 46 (see FIG. 9) having passed through the incidence end face 323a of the third propagation part 323 propagates through the third propagation part 323 and reaches the vicinity of the buffer part 33A. Here, the laser light 46 is totally reflected at the evanescent light generating surface 323c. This generates evanescent light 47 permeating into the buffer part 33A. Then, the evanescent light 47 and fluctuations of charges on at least the propagative edge 34a of the outer surface of the plasmon generator 34 are coupled with each other to induce a surface plasmon polariton mode. In this way, surface plasmons 48 are excited at least on the propagative edge 34a through coupling with the evanescent light 47 generated from the evanescent light generating surface 323c. Here, the laser light 46 may be polarized light of TM mode. In this case, the electric field of the laser light 46 oscillates perpendicularly to the evanescent light generating surface 323c facing the propagative edge 34a. This allows the plasmon generator 34 to generate surface plasmons of high intensity.

The surface plasmons 48 excited at least on the propagative edge 34a of the outer surface of the plasmon generator 34 are transformed into edge plasmons to propagate along the propagative edge 34a to the near-field light generating edge 34g. Consequently, the edge plasmons concentrate at the near-field light generating edge 34g, and near-field light 49 occurs from the near-field light generating edge 34g based on the edge plasmons. The near-field light 49 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

Now, with reference to FIG. 2 to FIG. 5, a description will be given of the principle of generation of near-field light by the grating 81 and the principle of photoelectric conversions by the photodiode 84. Part of the backward light 45 emitted from the second emission part 65b of the laser diode 60 passes through the surface of the protection layer 53 to be incident upon the grating 81. The backward light 45 incident upon the grating 81 causes an electromagnetic field to be produced along the surface of the grating 81, the electromagnetic field having a wave number greater than the wave number of the backward light 45. This electromagnetic field contains components whose wave number is equal to the wave number of surface plasmons that can exist on the grating 81. These components excite two-dimensional surface plasmons on the surface of the grating 81. The method of allowing incident light to excite surface plasmons on a grating is generally called the grating coupling method. In the present embodiment, near-field light 91 (see FIG. 5) is generated from the grating 81 based on the surface plasmons that are excited on the surface of the grating 81 as described above.

The near-field light 91 generates photoelectromotive force in the photodiode 84 as will be described below. The photodiode 84 is supplied with a predetermined voltage via the electrodes 55 and 56. This causes the depletion layer 89 contributing to photoelectric conversions to appear within the intrinsic layer 86. Under this condition, the near-field light 91 arriving at the depletion layer 89 generates electron and hole pairs corresponding to the amount of the near-field light 91. Of the electron and hole pairs, the electrons move to the n-type semiconductor layer 87 while the holes move to the p-type semiconductor layer 85. These movements cause photoelectromotive force to be produced between the electrodes 55 and 56 corresponding to the amount of the near-field light 91.

The aforementioned photoelectromotive force is detected by, for example, measuring the potential difference between the electrodes 55 and 56. Alternatively, the photoelectromotive force can also be detected by measuring the current flowing through a load connected between the electrodes 55 and 56. Detecting the photoelectromotive force in this manner allows detection of the near-field light 91. The magnitude of the photoelectromotive force depends on the intensity of the near-field light 91, and the intensity of the near-field light 91 depends on the intensity of the backward light 45 incident upon the grating 81. Accordingly, the magnitude of the photoelectromotive force teaches the intensity of the backward light 45.

Figure 13:
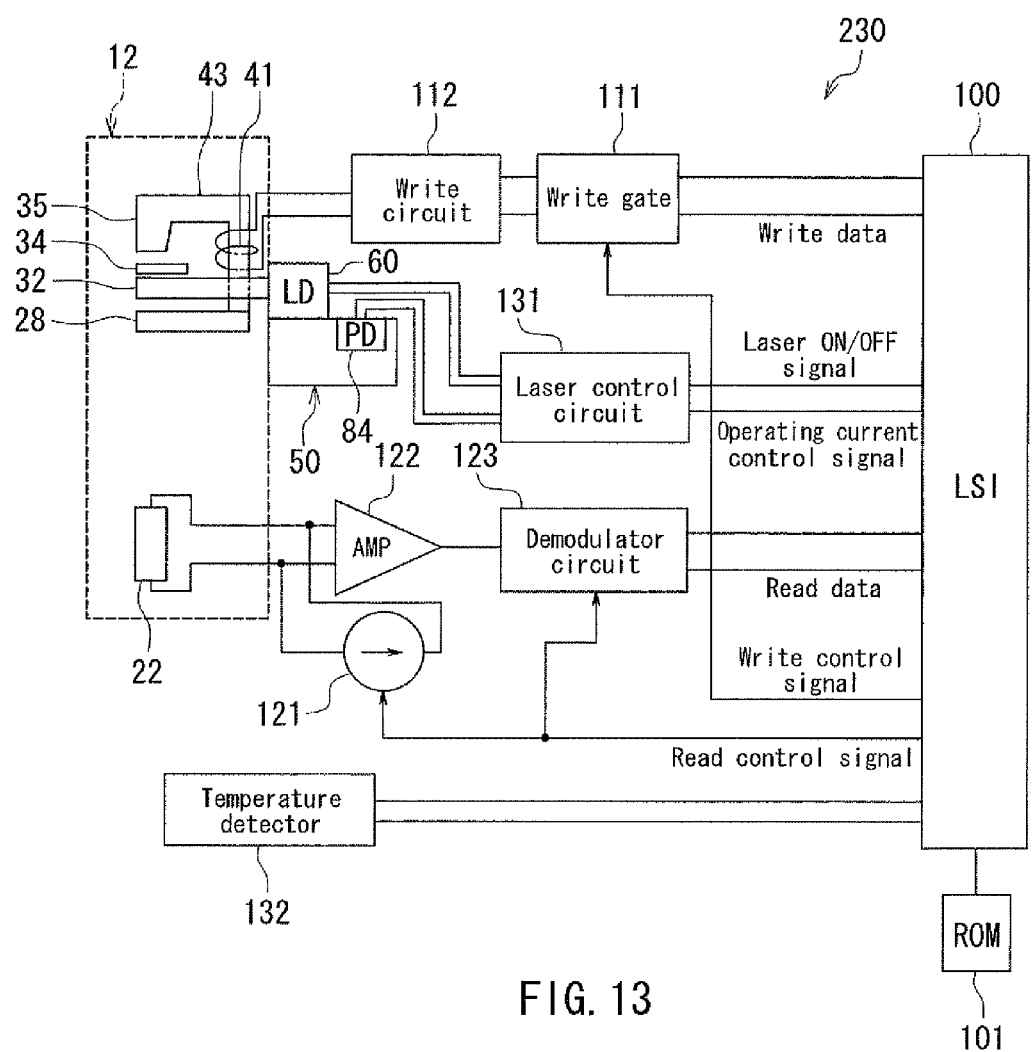
FIG. 13 is a block diagram showing the circuit configuration of the magnetic recording device according to the first embodiment of the invention.

Reference is now made to FIG. 13 to describe the circuit configuration of the control circuit 230 shown in FIG. 11 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60, the photodiode 84 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the first and second emission parts 65a and 65b of the laser diode 60 emit the forward light 44 and the backward light 45, respectively. The forward light 44 propagates through the core 32. Then, according to the principle of generation of near-field light described previously, the near-field light 49 occurs from the near-field light generating edge 34g of the plasmon generator 34. The near-field light 49 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for data writing.

In order that the forward light 44 of desired intensity will be emitted, the control LSI 100 consults the control table stored in the ROM 101 to determine the value of the operating current of the laser diode 60, and controls the laser control circuit 131 by using the operating current control signal so that the operating current of that value is supplied to the laser diode 60.

The backward light 45 emitted from the second emission part 65b of the laser diode 60 is incident upon the grating 81 as described above. As a result, the near-field light 91 occurs from the grating 81 and is detected by the photodiode 84. Based on the detection result provided by the photodiode 84, the laser control circuit 131 exercises feedback control of the intensity of the emitted light (the forward light 44 and the backward light 45) from the laser diode 60. More specifically, the laser control circuit 131 adjusts the value of the operating current to be supplied to the laser diode 60 so as to allow emission of the forward light 44 of desired intensity.

The control LSI 100 controls the laser control circuit 131 on the basis of such factors as the temperature of the magnetic recording layer of the magnetic disk 201 measured by the temperature detector 132. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 49, and data that indicates the temperature dependence of the coercivity of the magnetic recording layer.

As shown in FIG. 13, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the control circuit 230 may have any other configuration than the configuration shown in FIG. 13.

A method of manufacturing the slider 10 of the present embodiment will now be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure including a plurality of rows of pre-slider portions that are to become the sliders 10 later; and forming the sliders 10 by cutting the substructure to separate the pre-slider portions from each other. In the step of forming the sliders 10, the cut surfaces are polished into the medium facing surfaces 11a and 12a.

Next, a method of manufacturing the light source unit 50 of the present embodiment will be described briefly. The method of manufacturing the light source unit 50 includes the steps of: fabricating the unit substrate 51 with the photodiode 84 embedded therein; and mounting the laser diode 60 on the light source mount surface 51c of the unit substrate 51.

Reference is now made to FIG. 2 to FIG. 7 to describe how to bond the light source unit 50 onto the slide substrate 11. An insulating layer 57 made of an insulating material is formed over the rear surface 11b of the slider substrate 11 and the rear surface 12b of the head unit 12. As shown in FIG. 2 and FIG. 7, the light source unit 50 is secured to the slider 10 by bonding the bond surface 51a of the unit substrate 51 to the rear surface 11b with the insulating layer 57 therebetween. The insulating layer 57 is intended to electrically insulate the slider substrate 11 and the unit substrate 51 from each other. Reference numeral 58 in FIG. 2 and FIG. 7 indicates a bond layer. The laser diode 60 and the core 32 are positioned with respect to each other so that the forward light 44 emitted from the first emission part 65a of the laser diode 60 will be incident upon the incidence end 32a of the core 32.

Solder is an example of materials for the bond layer 58. Where solder is employed as the material of the bond layer 58, the light source unit 50 is secured to the slider 10 in the following manner, for example. First, the bond layer 58 is formed on the surface of the insulating layer 57 or on the bond surface 51a of the unit substrate 51. Then, the insulating layer 57 is opposed to the bond surface 51a of the unit substrate 51 so that the bond layer 58 comes in between the insulating layer 57 and the bond surface 51a. Next, the substrate body 52 is irradiated with laser light (e.g., Nd-YAG laser light having a wavelength of 1064 nm) from the side of the rear surface 51b of the unit substrate 51. This laser light propagates through the substrate body 52 to reach the bond layer 58, and heats the bond layer 58. The bond layer 58 is thus melted. The melted bond layer 58 then solidifies to thereby secure the light source unit 50 to the slider 10.

The effects of the light source unit 50 and the thermally-assisted magnetic recording head 1 according to the present embodiment will now be described. The light source unit 50 according to the present embodiment includes the laser diode 60 and the photodiode 84. The laser diode 60 has the first emission part 65a for emitting the forward light 44 and the second emission part 65b for emitting the backward light 45. The forward light 44 is used to generate the near-field light 49 that is used for thermally-assisted magnetic recording. The photodiode 84 has the light receiving surface 84a for receiving the backward light 45 emitted from the second emission part 65a, and detects the backward light 45.

Where no intensity control is exercised on emitted light (the forward light 44 and the backward light 45) from the laser diode 60, the intensity of the emitted light varies in response to variations in ambient temperature and variations in the temperature of the laser diode 60 caused by its own heat generation. Variations in the intensity of the forward light 44 lead to unfavorable variations in the intensity of the near-field light 49. In contrast to this, the present embodiment allows suppression of variations in the intensity of the emitted light (the forward light 44 and the backward light 45) from the laser diode 60 by detecting the intensity of the backward light 45 with the photodiode 84 and exercising feedback control of the intensity of the emitted light based on the detection result. Consequently, the present embodiment makes it possible to stabilize the intensity of the near-field light 49 and to thereby allow the thermally-assisted magnetic recording head 1 to perform a stable write operation.

The light source unit 50 further includes the grating 81 disposed to extend along the light receiving surface 84a. Now, suppose a case where the light source unit 50 does not include the grating 81. In this case, the backward light 45 is directly incident upon the light receiving surface 84a of the photodiode 84. In the present embodiment, the backward light 45 is divergent light, and the center 45C of the backward light 45 is parallel to the light receiving surface 84a. Under the situation, only part of the backward light 45 can be incident upon the light receiving surface 84a. Additionally, since the light receiving surface 84a receives the backward light 45 at a large incident angle, the light receiving surface 84a has a high reflectivity for the backward light 45. For these reasons, the photodiode 84 can receive a reduced amount of light.

In contrast to this, the present embodiment is configured so that the backward light 45 is incident upon the grating 81 to excite surface plasmons on the grating 81, and the near-field light 91 is generated based on the surface plasmons. As such, the present embodiment employs the grating 81 disposed along the light receiving surface 84a as the source of the near-field light 91, thereby ensuring that at least part of the near-field light 91 is detected by the photodiode 84. Furthermore, since the surface plasmons are excited based on the backward light 45 and the near-field light 91 is generated based on the surface plasmons, it is possible to enhance the electric field of the near-field light 91 relative to the backward light 45 by the electric field enhancement effects of the surface plasmons.

Furthermore, in the present embodiment, the grating 81 includes a plurality of line-shaped portions 82. The plurality of line-shaped portions 82 include a plurality of curved-line-shaped portions that are convex toward the direction of travel of the backward light 45. It is therefore possible to bring the shape of each line-shaped portion 82 closer to the shape of the wavefront of the backward light 45, as mentioned previously. The present embodiment thus makes it possible to increase the percentage of the backward light 45 that are scattered by the grating 81 (the plurality of line-shaped portions 82) and have a wave number equal to or nearly equal to the wave number of the surface plasmons. As a result, according to the present embodiment, it is possible to efficiently excite surface plasmons based on the backward light 45, and to thereby increase the amount of the near-field light 91.

If the light source unit 50 does not include the grating 81, most part of the scattered light that is produced by the backward light 45 being incident upon the light receiving surface 84a is not detected by the photodiode 84. In contrast to this, the present embodiment also makes it possible that diffracted light produced by the backward light 45 being incident upon the grating 81 can be directed toward the photodiode 84 and detected by the photodiode 84.

As can be seen from the above discussions, the present embodiment allows an increased amount of light to be received by the photodiode 84 as compared with the case where the light source unit 50 does not include the grating 81. Furthermore, since the present embodiment allows an increased amount of light to be received by the photodiode 84 as discussed above, it is possible to increase the response speed of the photodiode 84 and the response speed of feedback control dependent thereon, the feed back control being exercised on the intensity of the emitted light (the forward light 44 and the backward light 45) from the laser diode 60.

According to the present embodiment, it is not necessary to excessively increase the ratio of the intensity of the backward light 45 to the intensity of the forward light 44 in order to increase the amount of light to be received by the photodiode 84. Accordingly, it is not necessary to reduce the intensity of the forward light 44 that is used to generate the near-field light 49.

Furthermore, according to the present embodiment, it is not necessary to excessively increase the photodiode 84 in size in order to increase the amount of light to be received by the photodiode 84. The present embodiment thus makes it possible to provide a compact light source unit 50 suitable for use with a thermally-assisted magnetic recording head.

The light source unit 50 includes the unit substrate 51 having the light source mount surface 51c. The laser diode 60 is mounted on the light source mount surface 51c. The photodiode 84 is embedded in the unit substrate 51 (the substrate body 52) so that the light receiving surface 84a is located near the second emission part 65b of the laser diode 60. This configuration allows the second emission part 65b for emitting the backward light 45 to be diagonally located relative to the light receiving surface 84a, thereby readily realizing the arrangement of the laser diode 60 and the photodiode 84 that enables the backward light 45 to be incident upon the light receiving surface 84a.

For the laser diode 60 of the present embodiment, the distance between the second emission part 65b and the first surface 60a facing the light source mount surface 51c is smaller than the distance between the second emission part 65b and the second surface 60b opposite to the first surface 60a. The present embodiment thus allows the second emission part 65b and the photodiode 84 to be in sufficiently close proximity to each other, thereby allowing an increased amount of light to be received by the photodiode 84.

In the present embodiment, the photodiode 84 is embedded in the unit substrate 51 (the substrate body 52). This allows the light source unit 50 to have less projections and depressions as compared with a case where a photodiode element for detecting the backward light 45 is mounted on the light source mount surface 51c. As a result, the present embodiment can prevent air currents from being disturbed around the light source unit 50 in the thermally-assisted magnetic recording head 1.

In the present embodiment, the substrate body 52 with the photodiode 84 embedded therein may be fabricated by semiconductor fabrication process techniques. In this case, there will be no degradation in yield and reliability that could be caused by the step of mounting a photodiode separate from a substrate onto the substrate.

Second Embodiment

Figure 14:
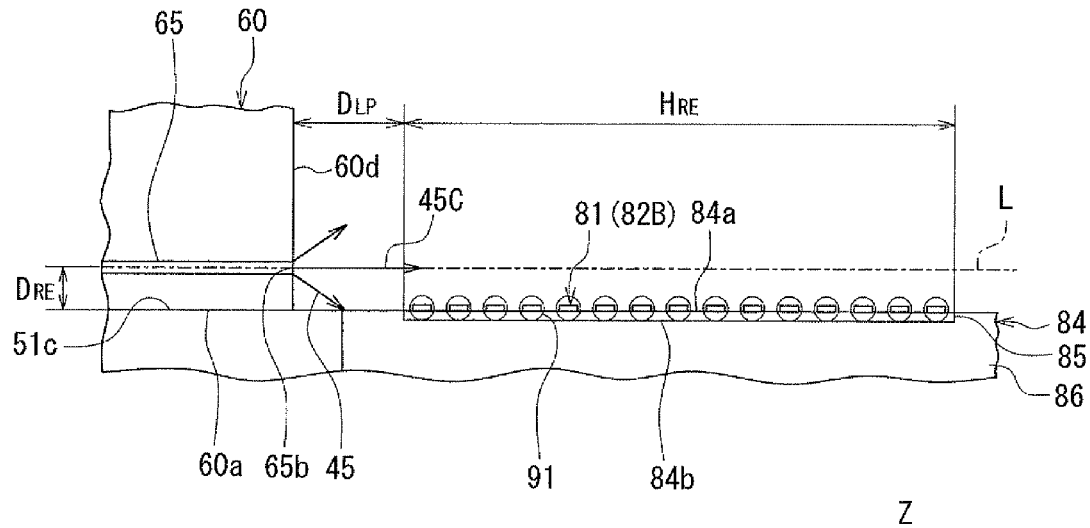
FIG. 14 is an explanatory diagram schematically illustrating the relationship between backward light and a light receiving surface of a photodiode in a light source unit according to a second embodiment of the invention.

A second embodiment of the present invention will now be described with reference to FIG. 14. FIG. 14 is an explanatory diagram schematically illustrating the relationship between the backward light 45 and the light receiving surface 84a of the photodiode 84 in the light source unit according to the present embodiment. In the present embodiment, the light receiving surface 84a is located in the second region R2 shown in FIG. 3. The plurality of line-shaped portions 82 of the grating 81 include only the second curved-line-shaped portions 82B shown in FIG. 3. In the present embodiment, the distance $D_{LP}$ from the rear end face 60d of the laser diode 60 to the light receiving surface 84a is 15 μm, for example.

The remainder of configuration, function and effects of the present embodiment are similar to those of the first embodiment.

Third Embodiment

Figure 15:
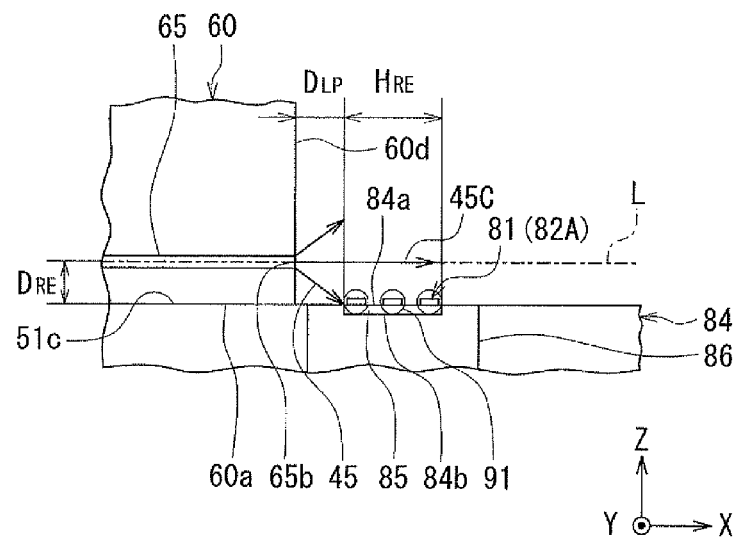
FIG. 15 is an explanatory diagram schematically illustrating the relationship between backward light and a light receiving surface of a photodiode in a light source unit according to a third embodiment of the invention.

A third embodiment of the present invention will now be described with reference to FIG. 15. FIG. 15 is an explanatory diagram schematically illustrating the relationship between the backward light 45 and the light receiving surface 84a of the photodiode 84 in the light source unit according to the present embodiment. In the present embodiment, the light receiving surface 84a is located in the first region R1 shown in FIG. 3. The plurality of line-shaped portions 82 of the grating 81 include only the first curved-line-shaped portions 82A shown in FIG. 3. In the present embodiment, the distance $D_{LP}$ from the rear end face 60d of the laser diode 60 to the light receiving surface 84a is 5 μm, for example. The length $H_{RE}$ of the light receiving surface 84a in the X direction is 10 μm, for example.

The remainder of configuration, function and effects of the present embodiment are similar to those of the first embodiment.

The present invention is not limited to the aforementioned embodiments, and various modifications may be made thereto. For example, in each of the aforementioned embodiments, the light receiving surface 84a is parallel to the center 45C of the backward light 45. However, the light receiving surface 84a can take any attitude relative to the center 45C of the backward light 45 except the attitude at right angles to the center 45C of the backward light 45.

In the case where the light receiving surface 84a is parallel to the center 45C of the backward light 45, the grating 81 may be disposed in such a position that the center 45C passes through the grating 81.

Furthermore, the photodiode 84 may have a structure other than that of the PIN diode. For example, the photodiode 84 may have a PN-diode structure. In this case, the interface between adjacent p-type and n-type semiconductor layers serves as the detection plane, that is, the interface between two semiconductor layers that creates a depletion layer contributing to photoelectric conversions.

The photodetector (photodiode) 84 is not limited to one that detects the backward light 45, but may be any type of detector so long as it detects emitted light from the light source (laser diode) 60. For example, the photodetector (photodiode) 84 may detect part of the forward light 44.

The light source unit 50 of the present invention is usable not only as a light source unit for a thermally-assisted magnetic recording head but also as a light source unit for an optical pickup in an optical information read/write apparatus or for an optical communication apparatus.

It is apparent that the present invention can be carried out in various forms and modifications in the light of the aforementioned descriptions. Accordingly, within the scope of the following claims and equivalents thereof, the present invention can be carried out in forms other than the aforementioned most preferable embodiments.

What is claimed is:

1. A light source unit comprising:
    a light source that has an emission part for emitting light;
    a photodetector that has a light receiving surface for receiving the light emitted from the emission part, and detects the light; and
    a grating that is made of metal and disposed to extend along the light receiving surface, the grating including a plurality of line-shaped portions that each extend in a direction intersecting a direction of travel of the light and that are located at positions different from each other along the direction of travel of the light, wherein
    the light source has a first emission part for emitting forward light and a second emission part for emitting backward light, and
    the light receiving surface receives the backward light.

2. The light source unit according to claim 1, wherein the light source is a laser diode.

3. The light source unit according to claim 1, wherein the photodetector is a photodiode.

4. The light source unit according to claim 3, wherein:
    the photodiode includes a plurality of semiconductor layers that are stacked one on another, and an interface between two of the semiconductor layers, the interface creating a depletion layer contributing to photoelectric conversion;
    the grating has a top surface that is farthest from the light receiving surface; and
    a maximum distance between the top surface of the grating and the interface in a direction perpendicular to the light receiving surface is greater than 5 nm and equal to or smaller than 400 nm.

5. The light source unit according to claim 1, wherein the grating has a thickness in the range of 5 to 200 nm.

6. The light source unit according to claim 1, wherein the metal of which the grating is made is one of Au, Ag, Al, Pd, Pt, Mg, Cu, In, Rh, Ir, and Ru, or an alloy composed of two or more of these materials.

7. The light source unit according to claim 1, further comprising a unit substrate having a light source mount surface, wherein:
the light source is mounted on the light source mount surface; and
the photodetector is embedded in the unit substrate.

8. The light source unit according to claim 1, wherein the light emitted from the emission part is divergent light, and the plurality of line-shaped portions include a plurality of curved-line-shaped portions that are convex toward the direction of travel of the light.

9. The light source unit according to claim 8, wherein two or more of the curved-line-shaped portions increase in radius of curvature with increasing distance from the emission part.

10. The light source unit according to claim 8, wherein two or more of the curved-line-shaped portions decrease in radius of curvature with increasing distance from the emission part.

11. The light source unit according to claim 8, wherein the plurality of curved-line-shaped portions include a plurality of first curved-line-shaped portions that decrease in radius of curvature with increasing distance from the emission part, and a plurality of second curved-line-shaped portions that increase in radius of curvature with increasing distance from the emission part, wherein the second curved-line-shaped portions are located farther from the emission part than are the first curved-line-shaped portions.

12. A thermally-assisted magnetic recording head comprising: a slider;
and a light source and a photodetector that are mounted on the slider, wherein:
the light source has an emission part for emitting light; and
the photodetector has a light receiving surface for receiving the light emitted from the emission part, and detects the light,
the thermally-assisted magnetic recording head further comprising a grating that is made of metal and disposed to extend along the light receiving surface, the grating including a plurality of line-shaped portions that each extend in a direction intersecting a direction of travel of the light and that are located at positions different from each other along the direction of travel of the light.

13. The thermally-assisted magnetic recording head according to claim 12, wherein the light source and the photodetector are unitized to be mounted on the slider.

14. The thermally-assisted magnetic recording head according to claim 12, wherein:
the light source has a first emission part for emitting forward light and a second emission part for emitting backward light; and
the light receiving surface receives the backward light.

15. The thermally-assisted magnetic recording head according to claim 12, wherein the slider includes:
a medium facing surface that faces a magnetic recording medium;
a magnetic pole that has an end face located in the medium facing surface and generates a write magnetic field for writing data on the magnetic recording medium;
a waveguide through which the light propagates; and
a plasmon generator that allows a surface plasmon to be excited thereon based on the light propagating through the waveguide and that generates near-field light from the medium facing surface based on the surface plasmon.

16. A head gimbal assembly comprising the thermally-assisted magnetic recording head according to claim 12, and a suspension that supports the thermally-assisted magnetic recording head.

17. A magnetic recording device comprising: a magnetic recording medium; the thermally-assisted magnetic recording head according to claim 12; a positioning device that supports the thermally-assisted magnetic recording head and positions the thermally-assisted magnetic recording head with respect to the magnetic recording medium; and a control circuit that controls the intensity of the light emitted from the emission part based on a detection result provided by the photodetector.

18. A light source unit comprising:
a light source that has an emission part for emitting light;
a photodetector, the photodetector being a photodiode, that has a light receiving surface for receiving the light emitted from the emission part, and detects the light; and
a grating that is made of metal and disposed to extend along the light receiving surface, the grating including a plurality of line-shaped portions that each extend in a direction intersecting a direction of travel of the light and that are located at positions different from each other along the direction of travel of the light, wherein
the photodiode includes a plurality of semiconductor layers that are stacked one on another, and an interface between two of the semiconductor layers, the interface creating a depletion layer contributing to photoelectric conversion,
the grating has a top surface that is farthest from the light receiving surface, and
a maximum distance between the top surface of the grating and the interface in a direction perpendicular to the light receiving surface is greater than 5 nm and equal to or smaller than 400 nm.

19. A light source unit comprising:
a light source that has an emission part for emitting light;
a photodetector that has a light receiving surface for receiving the light emitted from the emission part, and detects the light; and
a grating that is made of metal and disposed to extend along the light receiving surface, the grating including a plurality of line-shaped portions that each extend in a direction intersecting a direction of travel of the light and that are located at positions different from each other along the direction of travel of the light, wherein
the light emitted from the emission part is divergent light,
the plurality of line-shaped portions include a plurality of curved-line-shaped portions that are convex toward the direction of travel of the light, and
two or more of the curved-line-shaped portions increase in radius of curvature with increasing distance from the emission part.

20. A light source unit comprising:
a light source that has an emission part for emitting light;
a photodetector that has a light receiving surface for receiving the light emitted from the emission part, and detects the light; and
a grating that is made of metal and disposed to extend along the light receiving surface, the grating including a plurality of line-shaped portions that each extend in a direction intersecting a direction of travel of the light and that are located at positions different from each other along the direction of travel of the light, wherein
the light emitted from the emission part is divergent light, the plurality of line-shaped portions include a plurality of curved-line-shaped portions that are convex toward the direction of travel of the light, and two or more of the curved-line-shaped portions decrease in radius of curvature with increasing distance from the emission part.

21. A light source unit comprising:

a light source that has an emission part for emitting light;

a photodetector that has a light receiving surface for receiving the light emitted from the emission part, and detects the light; and a grating that is made of metal and disposed to extend along the light receiving surface, the grating including a plurality of line-shaped portions that each extend in a direction intersecting a direction of travel of the light and that are located at positions different from each other along the direction of travel of the light, wherein the light emitted from the emission part is divergent light, the plurality of line-shaped portions include a plurality of curved-line-shaped portions that are convex toward the direction of travel of the light, and the plurality of curved-line-shaped portions include a plurality of first curved-line-shaped portions that decrease in radius of curvature with increasing distance from the emission part, and a plurality of second curved-line-shaped portions that increase in radius of curvature with increasing distance from the emission part, wherein the second curved-line-shaped portions are located farther from the emission part than are the first curved-line-shaped portions.

* * * * *